(12) United States Patent
Kwak et al.

(10) Patent No.: US 12,041,333 B2
(45) Date of Patent: *Jul. 16, 2024

(54) CAMERA MODULE INCLUDING REFRACTIVE MEMBER AND ELECTRONIC DEVICE INCLUDING REFRACTIVE MEMBER

(71) Applicant: Samsung Electronics Co., Ltd., Gyeonggi-do (KR)

(72) Inventors: Hokeun Kwak, Gyeonggi-do (KR); Dongil Seo, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,548

(22) Filed: Aug. 10, 2023

(65) Prior Publication Data

US 2024/0015384 A1 Jan. 11, 2024

Related U.S. Application Data

(63) Continuation of application No. 18/118,810, filed on Mar. 8, 2023, now Pat. No. 11,785,323, which is a (Continued)

(30) Foreign Application Priority Data

| May 27, 2022 | (KR) | 10-2022-0065532 |
| Oct. 5, 2022 | (KR) | 10-2022-0127274 |
| Feb. 24, 2023 | (KR) | 10-2023-0024743 |

(51) Int. Cl.
*H04N 23/55* (2023.01)
*G02B 5/00* (2006.01)

(52) U.S. Cl.
CPC ............. *H04N 23/55* (2023.01); *G02B 5/003* (2013.01)

(58) Field of Classification Search
CPC ........ H04N 23/55; G01N 21/47; G02B 5/003; G02B 5/04; G02B 5/208; G02B 27/0018; G02B 1/11
(Continued)

(56) References Cited

U.S. PATENT DOCUMENTS 6,850,279 B1 2/2005 Scherling
7,120,309 B2 * 10/2006 Garcia ................... G02B 13/22
352/160

(Continued)

FOREIGN PATENT DOCUMENTS

JP 64-61328 A 3/1989
JP 11-142783 A 5/1995
(Continued)

OTHER PUBLICATIONS

International Search Report dated Aug. 28, 2023.
(Continued)

*Primary Examiner* — Pritham D Prabhakher
(74) *Attorney, Agent, or Firm* — Cha & Reiter, LLC

(57) ABSTRACT

According to certain embodiments, a camera module comprises a refractive member configured to reflect or refract at least a portion of light received by the camera module; and an image sensor configured to detect at least a portion of light reflected or refracted by the refractive member, wherein the refractive member includes an effective area configured to provide a path of the light and a dummy area disposed on at a portion of an edge of the effective area and configured to scatter at least a part of light incident onto the dummy area.

20 Claims, 13 Drawing Sheets

Related U.S. Application Data continuation of application No. PCT/KR2023/003099, filed on Mar. 7, 2023.

(58) Field of Classification Search
USPC .......................................................... 348/374
See application file for complete search history.

(56) References Cited

U.S. PATENT DOCUMENTS

| | | | |
|---|---|---|---|
| 7,170,558 B2 * | 1/2007 | Yokota | H04N 23/55 348/340 |
| 7,180,542 B2 * | 2/2007 | Iwasawa | G02B 13/009 348/340 |
| 7,382,546 B2 | 6/2008 | Konno | |
| 8,120,693 B2 * | 2/2012 | Nomura | H04N 23/54 359/372 |
| 8,395,854 B2 * | 3/2013 | Takakubo | G02B 13/0045 359/733 |
| 8,570,668 B2 * | 10/2013 | Takakubo | G02B 13/0065 359/726 |
| 9,386,222 B2 | 7/2016 | Georgiev et al. | |
| 9,541,740 B2 * | 1/2017 | Georgiev | H04N 23/698 |
| 9,804,390 B2 | 10/2017 | Sugihara et al. | |
| 10,082,649 B2 | 9/2018 | Park et al. | |
| 10,841,471 B1 | 11/2020 | Chang et al. | |
| 11,442,257 B2 | 9/2022 | Lin et al. | |
| 11,686,884 B2 * | 6/2023 | Shinohara | G02B 13/004 359/614 |
| 2003/0086624 A1 | 5/2003 | Garcia | |
| 2004/0095503 A1 | 5/2004 | Iwasawa et al. | |
| 2004/0109076 A1 | 6/2004 | Yokota et al. | |
| 2006/0092524 A1 | 5/2006 | Konno | |
| 2007/0024739 A1 | 2/2007 | Konno | |
| 2008/0291543 A1 | 11/2008 | Nomura et al. | |
| 2009/0153726 A1 | 6/2009 | Lim | |
| 2009/0322927 A1 | 12/2009 | Ito et al. | |
| 2012/0075726 A1 | 3/2012 | Takakubo et al. | |
| 2012/0075728 A1 | 3/2012 | Takakubo et al. | |
| 2015/0260988 A1 | 9/2015 | Sugihara et al. | |
| 2015/0370040 A1 | 12/2015 | Georgiev | |
| 2016/0286121 A1 | 9/2016 | Georgiev et al. | |
| 2017/0131526 A1 * | 5/2017 | Park | H04N 23/57 |
| 2018/0172600 A1 | 6/2018 | Wietzorrek | |
| 2020/0183058 A1 | 6/2020 | Shinohara | |
| 2021/0063617 A1 | 3/2021 | Yang et al. | |
| 2022/0128407 A1 | 4/2022 | Lee et al. | |
| 2023/0273412 A1 | 8/2023 | Kim | |

FOREIGN PATENT DOCUMENTS

| | | |
|---|---|---|
| JP | 2008-94658 A | 4/2008 |
| KR | 10-2017-0139975 A | 12/2017 |
| KR | 10-2021-0015288 A | 2/2021 |
| KR | 10-2021-0027171 A | 3/2021 |
| KR | 10-2021-0151464 A | 12/2021 |
| KR | 10-2022-0026874 A | 3/2022 |
| KR | 10-2022-0056101 A | 5/2022 |

OTHER PUBLICATIONS

Lens Flare Dec. 4, 2022.
Physically Based Rendering Theory 2004-2022.
Stray Light Webinar May 10, 2011.

* cited by examiner

CAMERA MODULE INCLUDING REFRACTIVE MEMBER AND ELECTRONIC DEVICE INCLUDING REFRACTIVE MEMBER

CROSS-REFERENCE TO RELATED APPLICATIONS

This application is a continuation of U.S. patent application Ser. No. 18/118,810 which was filed on Mar. 8, 2023, claiming priority of International Application No. PCT/KR2023/003099 designating the United States, filed on Mar. 7, 2023 in the Korean Intellectual Property Receiving Office and claiming priority to Korean patent application No. 10-2022-0065532, filed on May 27, 2022, Korean patent application No. 10-2022-0127274 filed on Oct. 5, 2022, and Korean patent application No. 10-2023-0024743 filed on Feb. 24, 2023 in the Korean Intellectual Property Office, the disclosures of all of which are incorporated by reference herein in their entireties

BACKGROUND

1. Technical Field

The disclosure relates to a camera module including a refractive member and an electronic device including a refractive member.

2. Description of Related Art

Numerous functions can be integrated into one portable electronic device. For example, an electronic device may implement not only telephone and text functions but also entertainment functions, such as playing games, multimedia functions, such as playing music and videos, communication and security functions for mobile banking, and scheduling and e-wallet functions. Such electronic devices become compact enough for users to carry in a convenient way.

An electronic device can be equipped with a compact and lightweight camera module. Users may take advantage of various functionalities of an electronic device with camera modules, such as photographing, video recording, video call, augmented reality (AR), etc., in a convenient manner, while carrying it all the time.

The electronic device may obtain a wide-angle image by capturing a wide-range scene around the electronic device using a wide-angle camera or obtain a telescopic image by capturing a scene corresponding to a location relatively far from the electronic device, using the telescopic camera.

The above-described information may be provided as a background art for helping understand the disclosure. No claim or determination is raised regarding whether any of the above description is applicable as a prior art in connection with the disclosure.

SUMMARY

According to certain embodiments, a camera module comprises a refractive member configured to reflect or refract at least a portion of light received by the camera module; and an image sensor configured to detect at least a portion of light reflected or refracted by the refractive member, wherein the refractive member includes an effective area configured to provide a path of the light and a dummy area disposed on at a portion of an edge of the effective area and configured to scatter at least a part of light incident onto the dummy area.

According to another embodiment, an electronic device comprises a housing; and a camera module at least a least partially disposed in the housing, wherein the camera module includes, an optical member including at least one lens, a refractive member configured to reflect or refract at least a portion of light, and an image sensor configured to detect at least a portion of light reflected or refracted by the refractive member, wherein the refractive member includes an effective area configured to provide a path of the light and a dummy area dispose on at least a portion of an edge of the effective area and configured to scatter at least a part of light incident into the dummy area.

According to certain embodiments, a camera module comprises: an optical member including at least one lens; a refractive member configured to reflect or refract at least a portion of light; and an image sensor configured to detect at least a portion of light reflected or refracted by the refractive member and positioned behind the refractive member, wherein the refractive member includes an effective area including an incident surface, a reflective surface, and an exit surface, and a dummy area disposed at at least a portion of an edge of the effective area, wherein a surface reflectance of the dummy area is 2.0% or less, and a surface roughness of the dummy area is 1.0 μm or more, and wherein a surface reflectance of the effective area exceeds 2.0%, and a surface roughness of the effective area is less than 1.0 μm.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

A folded optics camera may be useful for extending or enlarging the focal length in a small electronic device with a plurality of camera modules. For example, in a folded camera, a direction in which lenses are arranged may be set regardless of a direction that external light is incident onto an optical member, such as a prism, so that the focal length may be easily extended. As the degree of freedom in the design of the arrangement direction of the lenses in the folded camera is enhanced, a downsized telephoto camera may be implemented. The telephoto camera may be combined with a wide-angle camera and mounted in an electronic device. However, internal reflection should be mitigated, if not avoided, to preserve the quality of the image. For example, in the folded optics camera, a flare may occur due to light reflected from the refractive member (e.g., a prism).

According to an embodiment of the disclosure, there may be provided a lens assembly and/or a camera module capable of easily implementing a telephoto function in a small electronic device.

According to an embodiment of the disclosure, there may be provided a camera module capable of reducing flare in a folded optics camera.

The disclosure is not limited to the foregoing embodiments but various modifications or changes may rather be made thereto without departing from the spirit and scope of the disclosure.

Figure 1:
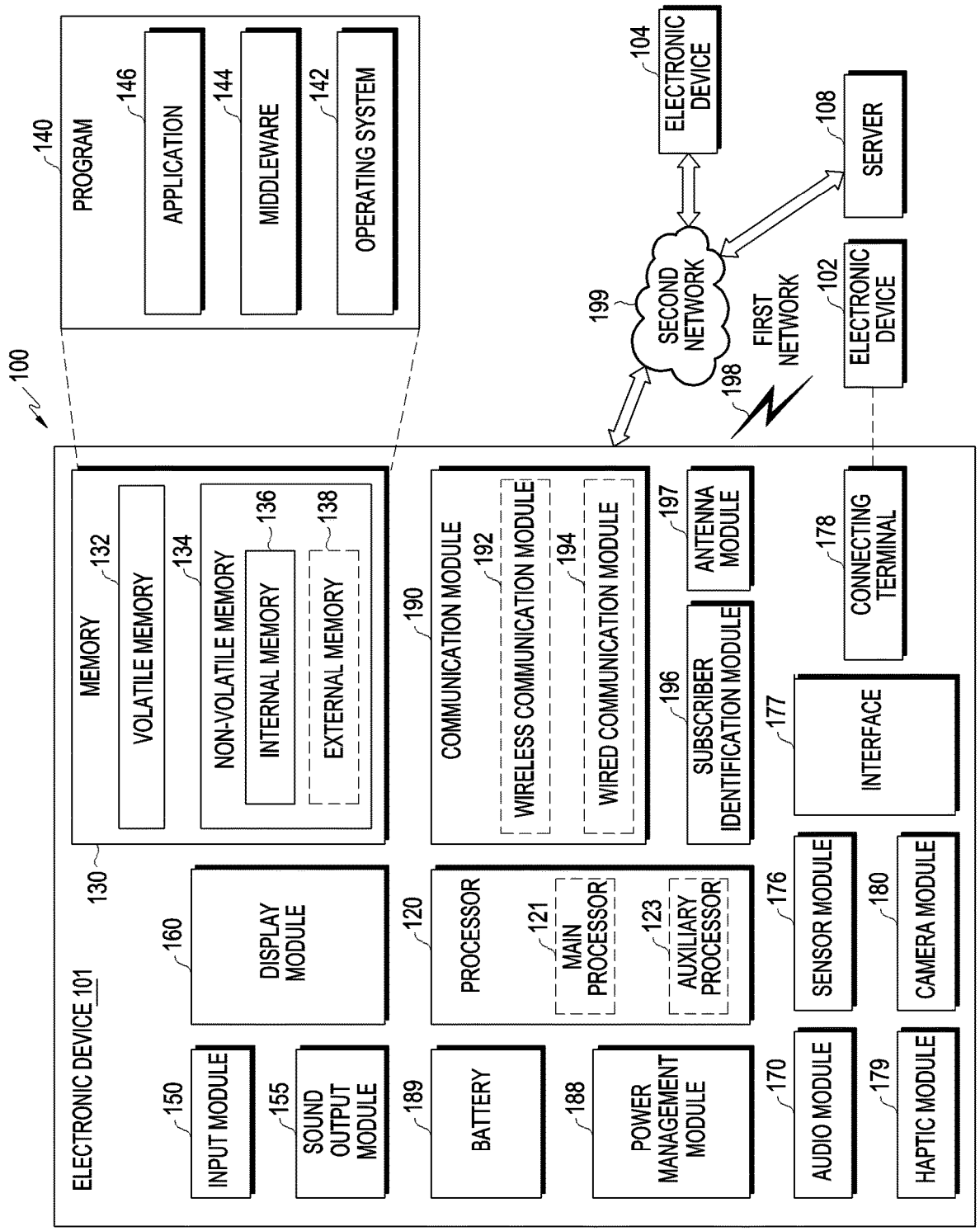
FIG. 1 is a block diagram illustrating an electronic device in a network environment according to certain embodiments of the disclosure.
Figure 2:
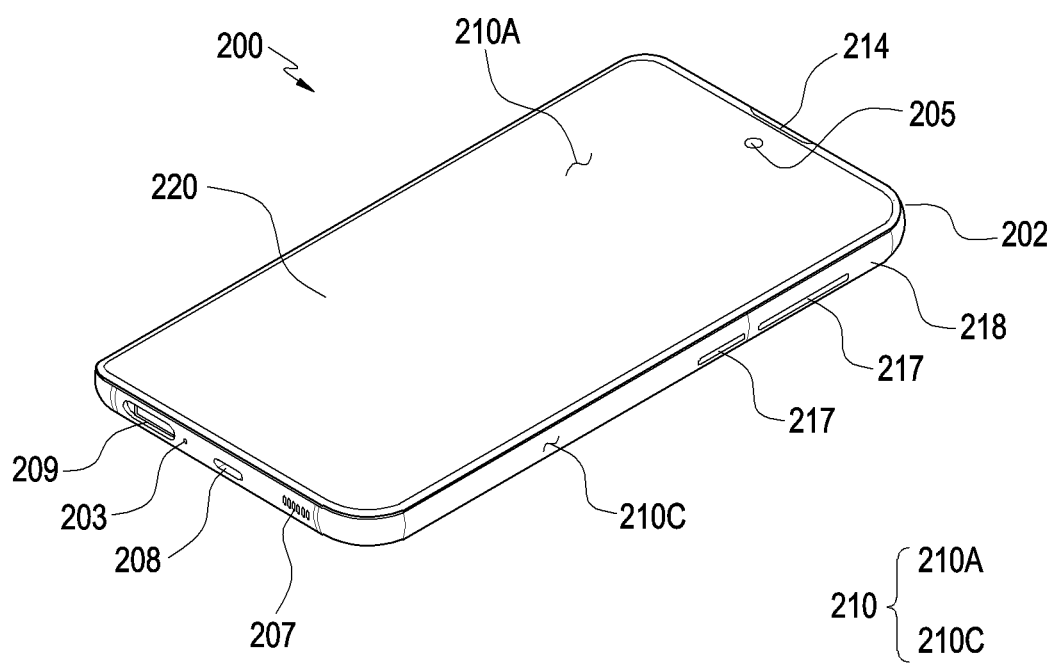
FIG. 2 is a front perspective view illustrating an electronic device according to an embodiment of the disclosure.
Figure 3:
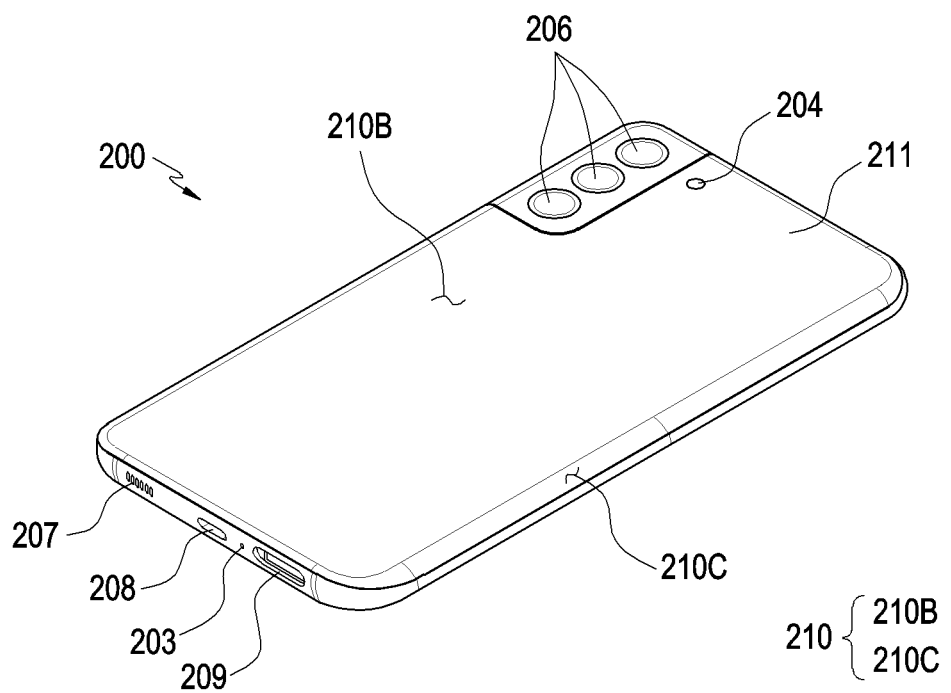
FIG. 3 is a rear perspective view illustrating an electronic device according to an embodiment of the disclosure.
Figure 4:
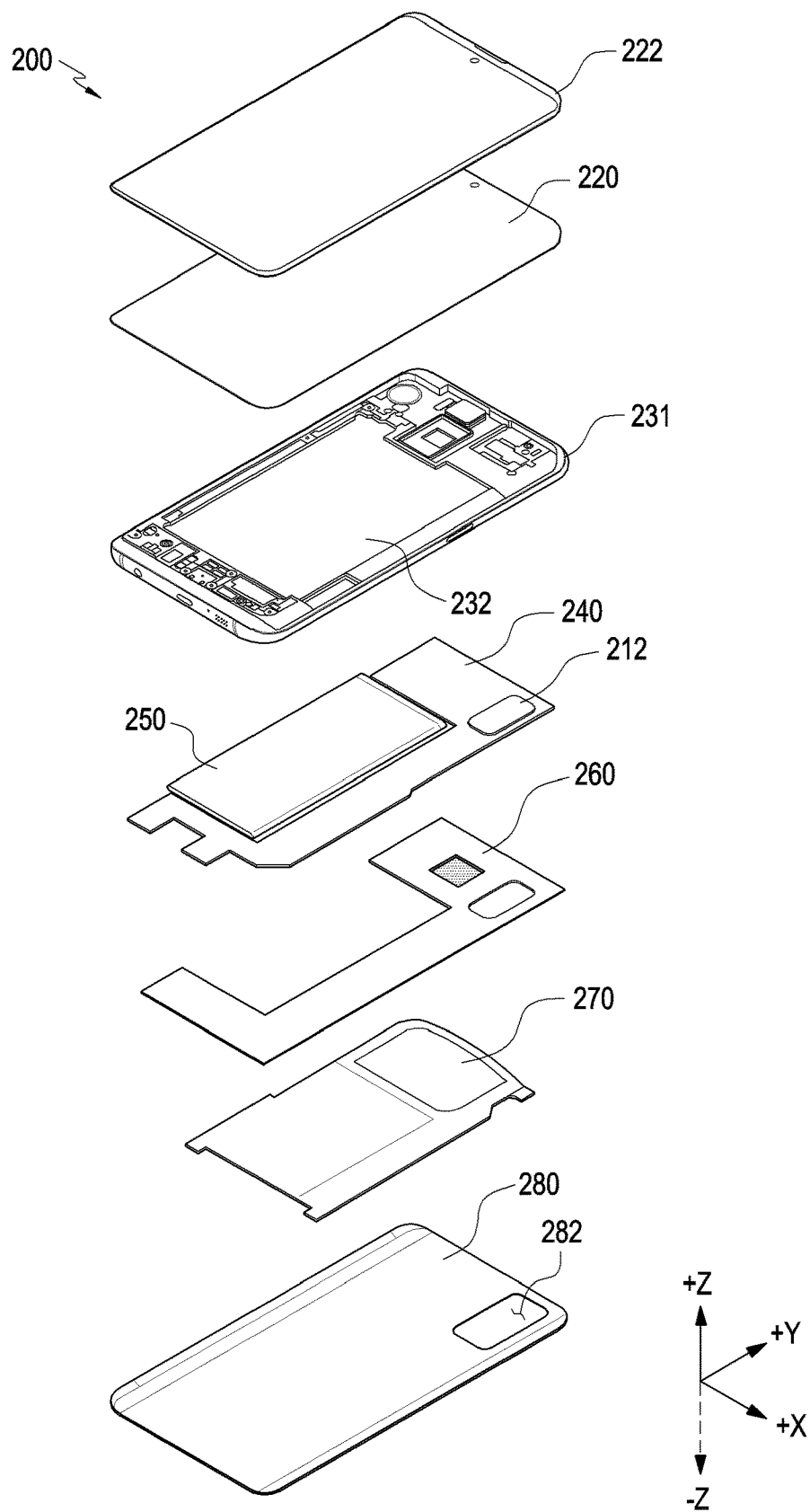
FIG. 4 is an exploded perspective view illustrating an electronic device according to an embodiment of the disclosure.
Figure 5:
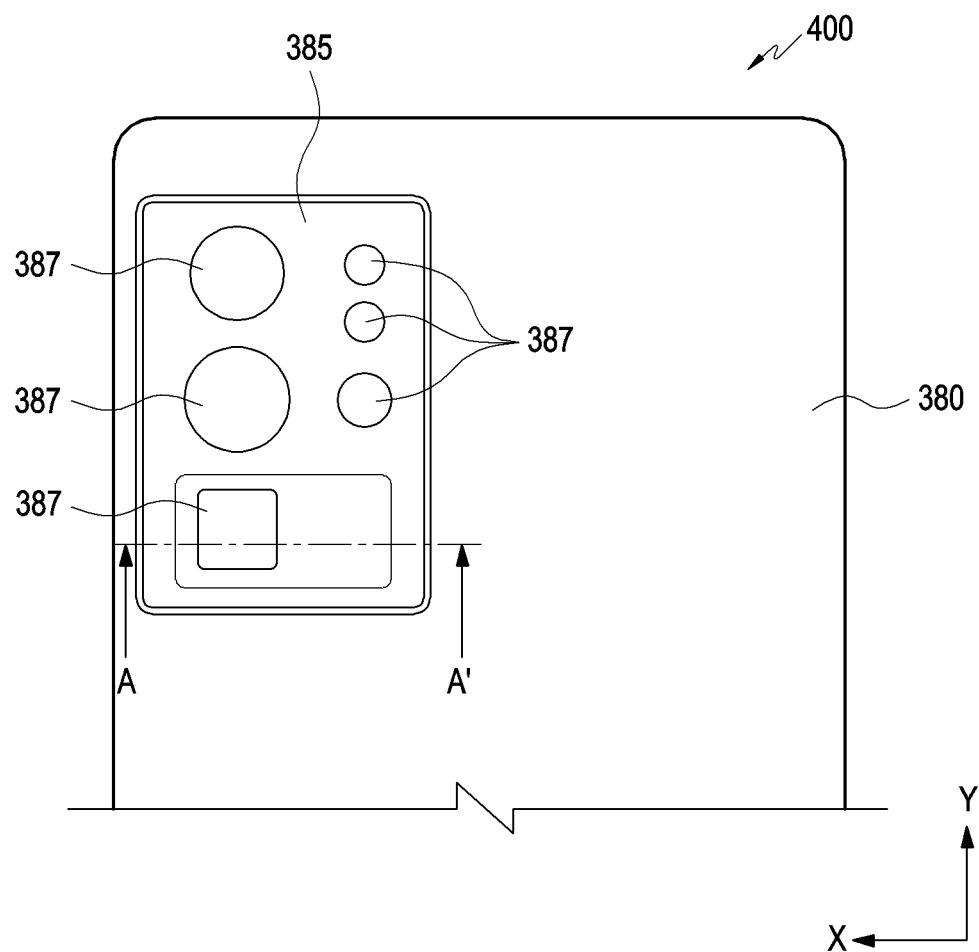
FIG. 5 is a rear view illustrating an electronic device according to an embodiment of the disclosure.
Figure 6:
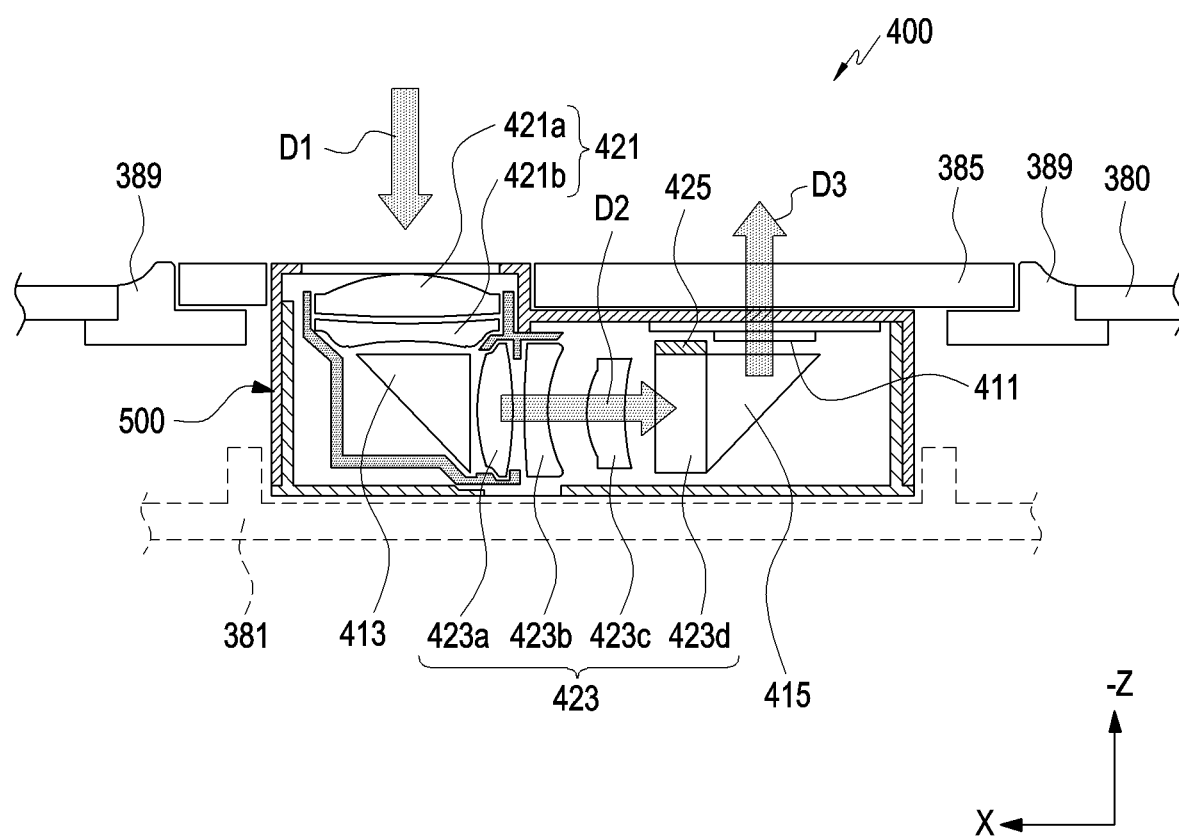
FIG. 6 is a cross-sectional view taken along line A-A' of FIG. 5.
Figure 7:
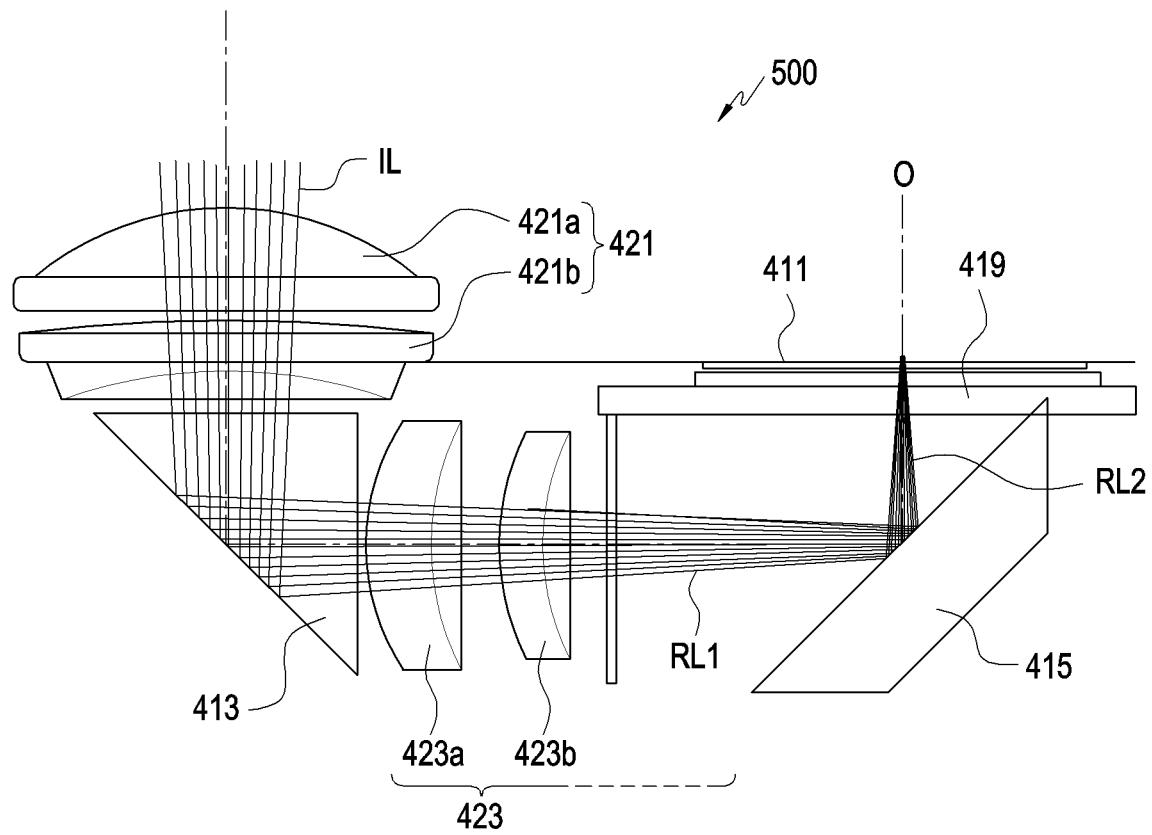
FIG. 7 is an example view illustrating an optical path of a camera module according to an embodiment of the disclosure.
Figure 8A:
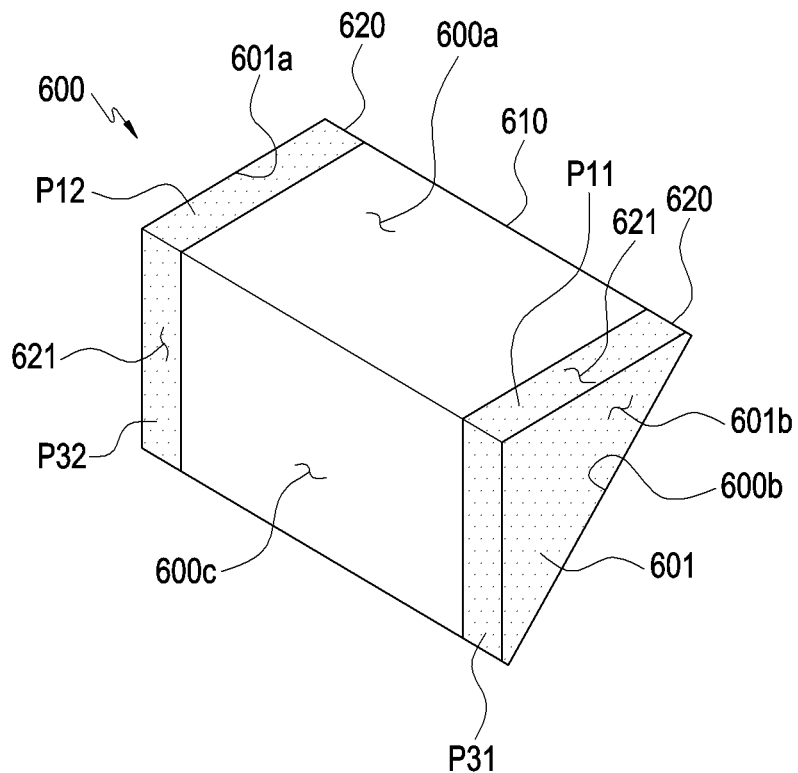
FIG. 8a is a perspective view illustrating a refractive member according to an embodiment of the disclosure.
Figure 8B:
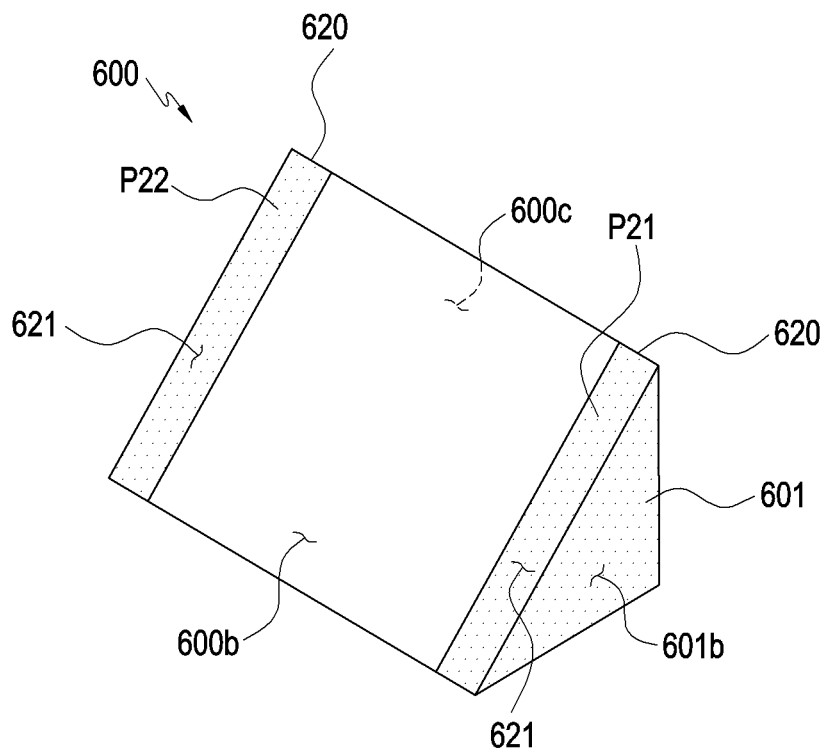
FIG. 8b is a perspective view illustrating a refractive member according to an embodiment of the disclosure.
Figure 9:
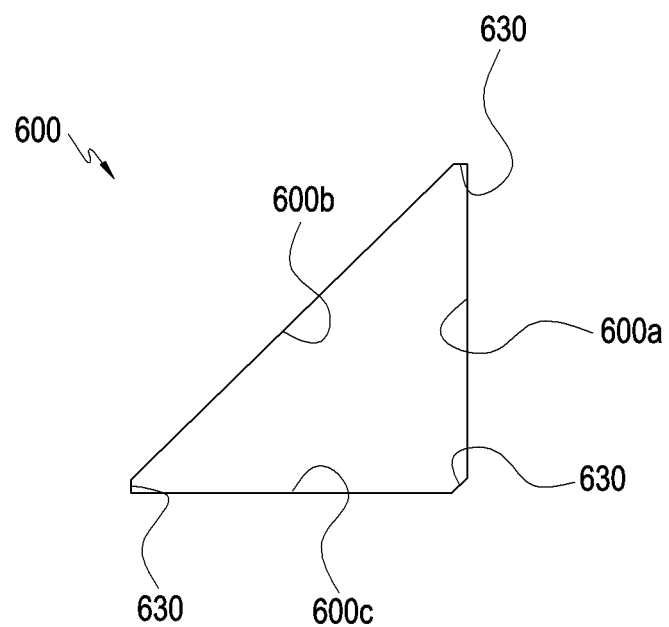
FIG. 9 is a side view illustrating a refractive member viewed from another direction according to an embodiment of the disclosure.

FIG. 1 describes an electronic device 100 with a camera module. The electronic device 100 includes a camera module 180. The camera module 180 can be exposed proximate to an external surface of the housing. FIGS. 2-4 discloses the housing of the electronic device. The camera module 180 can be disposed, such that an optical axis of the camera module is along the thickness (Z axis). Disposing the camera module 180 such that the optical axis is along the thickness of the electronic device allows the user to view a preview of the image received by the camera module 180 before capturing it. However, the thickness or Z axis, leaves very little room for the optical axis, particularly with a camera module 500 with a telephoto lens assembly. A telephoto lens assembly can include lenses that move along the optical axis. Accordingly, the camera module 500 can include refractive members 413, 415 that refract light from along the thickness of the electronic device to the width or length dimensions. FIGS. 5-7 disclose a camera module 500 with refractive members 413, 415. Additionally, to prevent ghost images, the camera module 500 can scatter some of the received light. Accordingly, the refractive members may include a dummy area. FIGS. 8a, 8b, and 9 disclose the refractive members. The refractive members include an effective area that refracts light, and a dummy area that scatters light.

Electronic Device

FIG. 1 is a block diagram illustrating an electronic device in a network environment according to certain embodiments of the disclosure;

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to certain embodiments, each component (e.g., a module or a program) of the above-described components may include a single entity or multiple entities. Some of the plurality of entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The camera module 180 can be disposed in position within the housing of the electronic device where external light can be incident, thereon. For example, a lens of the camera module 180 can be exposed to an exterior surface of the housing, or disposed proximate to the exterior surface, FIGS. 2-4 describe the housing of the electronic device.

Housing

FIG. 2 is a front perspective view illustrating a housing of an electronic device according to an embodiment of the disclosure. FIG. 3 is a rear perspective view illustrating a housing of an electronic device according to an embodiment of the disclosure. The electronic device 200 includes camera modules 205, 206. The camera modules 205, 206 are disposed proximate to the front and rear surfaces of the electronic device 200, respectively. Camera module 205 can be considered a "selfie camera."

Referring to FIGS. 2 and 3, according to an embodiment, an electronic device 200 may include a housing 210 with a front surface 210A, a rear surface 210B, and a side surface 210C surrounding a space between the front surface 210A and the rear surface 210B The housing 210 may denote a structure forming part of the front surface 210A, the rear surface 210B, and the side surface 210C of FIG. 2. For example, the housing 210 may include a front plate 202 and a rear plate 211. At least part of the front surface 210A may have a substantially transparent front plate 202 (e.g., a glass plate or polymer plate including various coat layers). The rear surface 210B may be formed by a rear plate 211. The rear plate 211 may be formed of, e.g., glass, ceramic, polymer, metal (e.g., titanium (Ti), stainless steel (STS), aluminum (Al), or magnesium (Mg)), or a combination of at least two thereof. The side surface 210C may be formed by a side bezel structure (or a "side member") 218 that couples to the front plate 202 and the rear plate 211 and includes a metal and/or polymer. The rear plate 211 and the side bezel plate 218 may be integrally formed together and include the same material (e.g., glass, metal, such as aluminum, or ceramic). According to an embodiment, the front surface 210A and/or the front plate 202 may be interpreted as a part of the display 220.

The electronic device 200 may include at least one of a display 220, audio modules 203, 207, and 214 (e.g., the audio module 170 of FIG. 1), a sensor module (e.g., the sensor module 176 of FIG. 1), camera modules 205 and 206 (e.g., the camera module 180 of FIG. 1), a key input device 217 (e.g., the input module 150 of FIG. 1), and connector holes 208 and 209 (e.g., the connection terminal 178 of FIG. 1). The electronic device 200 may exclude at least one (e.g., the connector hole 209) of the components or may add other components. The display 220 may be visually revealed through, e.g., a majority portion of the front plate 202.

The surface (or the front plate 202) of the housing 210 may include a screen display area formed as the display 220 is visually exposed. For example, the screen display area may include the front surface 210A.

The electronic device 200 may include a recess or opening formed in a portion of the screen display area (e.g., the front surface 210A) of the display 220 and may include at least one or more of an audio module 214, a sensor module (not shown), a light emitting device (not shown), and a camera module 205 aligned with the recess or opening. According to an embodiment (not shown), at least one or more of the audio module 214, sensor module (not shown), camera module 205, fingerprint sensor (not shown), and light emitting device (not shown) may be included on the rear surface of the screen display area of the display 220.

The display 220 may be coupled with or disposed adjacent to a touch detection circuit, a pressure sensor capable of measuring the strength (pressure) of touches, and/or a digitizer for detecting a magnetic field-type stylus pen.

The audio modules 203, 207, and 214 may include, e.g., a microphone hole 203 and speaker holes 207 and 214. The microphone hole 203 may have a microphone inside to obtain external sounds. There may be a plurality of microphones to be able to detect the direction of a sound. The speaker holes 207 and 214 may include an external speaker hole 207 and a phone receiver hole 214. The speaker holes 207 and 214 and the microphone hole 203 may be implemented as a single hole, or speakers may be included without the speaker holes 207 and 214 (e.g., piezo speakers).

The sensor modules (not shown) may generate an electrical signal or data value corresponding to an internal operating state or external environmental state of the electronic device 200. The sensor module (not shown) may include, e.g., a first sensor module (not shown) (e.g., a proximity sensor) and/or a second sensor module (not shown) (e.g., a fingerprint sensor) disposed on the front surface 210A of the housing 210. The sensor module (not shown) may include a third sensor module (not shown) (e.g., an HRM sensor) and/or a fourth sensor module (not shown) (e.g., a fingerprint sensor) disposed on the rear surface 210B of the housing 210). In an embodiment (not shown), the fingerprint sensor may be disposed on the rear surface 210B as well as on the front surface 210A (e.g., the display 220) of the housing 210. The electronic device 200 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor (not shown).

The camera modules 205 and 206 may include a front camera module 205 disposed on the first surface 210A of the electronic device 200 and a rear camera module 206 and/or a flash 204 disposed on the rear surface 210B. The camera modules 205 and 206 may include one or more lenses, an image sensor, and/or an image signal processor. The flash 204 may include, e.g., a light emitting diode (LED) or a xenon lamp. Two or more lenses (an infrared (IR) camera, a wide-angle lens, and a telephoto lens) and image sensors may be disposed on one surface of the electronic device 200.

The key input device 217 may be disposed on the side surface 210C of the housing 210. The electronic device 200 may exclude all or some of the above-mentioned key input devices 217 and the excluded key input devices 217 may be implemented in other forms, e.g., as soft keys, on the display 220. According to an embodiment, at least a portion of the key input device 217 may be disposed on the side bezel structure 218.

The light emitting device may be disposed on, e.g., the front surface 210A of the housing 210. The light emitting device (not shown) may provide, e.g., information about the state of the electronic device 200 in the form of light. The light emitting device (not shown) may provide a light source that interacts with, e.g., the front camera module 205. The light emitting device (not shown) may include, e.g., alight emitting diode (LED), an infrared (IR) LED, and/or a xenon lamp.

The connector holes 208 and 209 may include a first connector hole 208 for receiving a connector (e.g., an earphone jack) for transmitting/receiving audio signals to/from an external electronic device or a connector (e.g., a USB connector) for transmitting/receiving power and/or data to/from the external electronic device and/or a second connector hole 209 for receiving a storage device (e.g., a subscriber identification module (SIM) card). The first connector hole 208 and/or the second connector hole 209 may be omitted.

FIG. 4 is an exploded perspective view illustrating an electronic device according to an embodiment of the disclosure;

Referring to FIG. 4, an electronic device 200 (e.g., the electronic device 200 of FIGS. 2 and 3) may include at least one of a front plate 222 (e.g., the front plate 202 of FIG. 2), a display 220. (e.g., the display 220 of FIG. 2), a bracket 232 (e.g., a front supporting member), a printed circuit board 240, a battery 250, a rear case 260 (e.g., a rear supporting member), an antenna 270, and a rear plate 280 (e.g., the rear plate 211 of FIG. 3). The electronic device 200 may omit at least one (e.g., the rear case 260) of the components or may add other components. At least one of the components of the electronic device 200 may be the same or similar to at least one of the components of the electronic device 200 of FIG. 2 or 3 and no duplicate description is made below. The configuration of the side bezel structure 231, the bracket 232, the rear case 260, and/or the rear plate 280 may be interpreted as a structure included in the housing (e.g., the housing 210 of FIG. 2) of the electronic device 200. For example, the side bezel structure 231, the bracket 232, the rear case 260, and/or the rear plate 280 may be part of the housing 210.

The bracket 232 may be disposed inside the electronic device 200 to be connected with the side bezel structure 231 or integrated with the side bezel structure 231. The bracket 232 may be formed of, e.g., a metal and/or non-metallic material (e.g., polymer). The bracket 232 may receive the display 220 on one surface and the printed circuit board 240 on the other surface. A processor (e.g., the processor 120 of FIG. 1), a memory (e.g., the memory 130 of FIG. 1), and/or an interface (e.g., the interface 177 of FIG. 1) may be mounted on the printed circuit board 240.

The battery 250 may be a device for supplying power to at least one component (e.g., the camera module 212) of the electronic device 200. The battery 250 may include, e.g., a primary cell which is not rechargeable, a secondary cell which is rechargeable, or a fuel cell. At least a portion of the battery 250 may be disposed on substantially the same plane as the printed circuit board 240. The battery 250 may be integrally or detachably disposed inside the electronic device 200.

The rear case 260 may be disposed between the printed circuit board 240 and the antenna 270. For example, the rear case 260 may include one surface to which at least one of the printed circuit board 240 and the battery 250 is coupled, and another surface to which the antenna 270 is coupled.

The antenna 270 may be disposed between the rear plate 280 and the battery 250. The antenna 270 may include, e.g., a near-field communication (NFC) antenna, a wireless charging antenna, and/or a magnetic secure transmission (MST) antenna. The antenna 270 may perform short-range communication with, e.g., an external device or may wirelessly transmit or receive power necessary for charging. For example, the antenna 270 may include a coil for wireless charging. According to an embodiment, an antenna structure may be formed by a portion or combination of the side bezel structure 231 and/or the bracket 232.

The electronic device 200 may include a camera module 212 disposed in the second housing (e.g., the housing 210 of FIG. 2). The camera module 212 may be disposed on the bracket 232 and may be a rear camera module (e.g., the camera module 206 of FIG. 3) capable of obtaining an image of a subject positioned behind (e.g., the −Z direction) of the electronic device 200. According to an embodiment, at least a portion of the camera module 212 may be exposed to the outside of the electronic device 200 through the opening 282 formed in the rear plate 280. The configuration of the camera module 212 may be identical in whole or part to the configuration of the camera module 206 of FIG. 3.

The electronic device 200 disclosed in FIGS. 2 to 4 has a bar-type or plate-type appearance but the disclosure is not limited thereto. For example, the illustrated electronic device may be a rollable electronic device or a foldable electronic device. "Rollable electronic device" may mean an electronic device at least a portion of which may be wound or rolled or received in a housing (e.g., the housing 210 of FIG. 2) as the display (e.g., the display 220 of FIG. 4) may be bent and deformed. As the display is stretched out or is exposed to the outside in a larger area according to the user's need, the rollable electronic device may use an expanded second display area.

Camera Module

FIGS. 5-7 describe camera modules. The electronic device 400 can include camera modules that provide a wide or ultrawide angle, and telephoto. Wide and ultrawide camera modules have a shorter optical axis, while the camera modules that include a telephoto lens have a longer optical axis. The optical axis can be disposed along the thickness of the electronic device. As can be seen in FIGS. 2 and 3, the electronic device may be very thin. In the case of a camera module with a telephoto lens, the optical axis may extend longer than the thickness of the electronic device. This can cause at least part of the camera module to protrude from the electronic device.

In certain embodiments, refractive members may be used to refract light to a lens assembly that is disposed about a length or width the electronic device. Since the length and width are considerably longer dimensions, the lens assembly can have more room.

FIG. 5 is a rear view illustrating an electronic device according to an embodiment of the disclosure. FIG. 6 is a cross-sectional view taken along line A-A' of FIG. 5. FIG. 7 is an example view illustrating an optical path of a camera module according to an embodiment of the disclosure.

Referring to FIGS. 5, 6, and/or 7, an electronic device 400 may include a rear plate 380 and a camera module 500. The configuration of the rear plate 380 and the camera module 500 of FIGS. 5, 6, and/or 7 may be identical in whole or part to the configuration of the rear plate 280 and the camera module 212 of FIG. 4.

The electronic device 400 may include a camera cover plate 385 disposed on a surface (e.g., the rear surface 210B of FIG. 3). In an embodiment, the camera cover plate 385 may be a portion of the rear plate 380. In an embodiment, the camera cover plate 385 may be coupled to the rear plate 380 through an ornamental member 389, and when it is viewed from the outside, the ornamental member 389 may be exposed in a form surrounding the camera cover plate 385.

The camera cover plate 385 may include a plurality of transparent areas 387. The electronic device 400 may receive external light or externally radiate light through at least one of the transparent areas 387. For example, the electronic device 400 may include at least one camera module 500 (e.g., the camera modules 180 and 212 of FIGS. 1 and/or 4) disposed to correspond to at least some of the transparent areas 387 and at least one light source (e.g., an infrared light source) disposed to correspond to others of the transparent areas 387.

The light source may emit light to the area outside of the electronic device 400. The surrounding environment may then reflect the light to provide a better photograph.

The camera module 500 may receive external light from the outside of the electronic device 400 through any one of the transparent areas 387. In an embodiment, the electronic device 400 or the camera module 500 may further include a camera supporting member 381. The camera supporting member 381 may place or fix at least one of the camera module 500 or another camera module (e.g., a wide-angle camera, an ultra-wide-angle camera, or a macro camera) adjacent to the camera module 500 to the inside of the rear plate 380 or the camera cover plate 385. The camera cover plate 385 may visually expose at least a portion of the camera module 500 from an exterior of the electronic device 400 while harmonizing the at least a portion of the camera module 500 with the exterior of the electronic device 400. In an embodiment, the camera supporting member 381 may be substantially part of the bracket 232 or rear case 260 of FIG. 4.

The electronic device 400 may include the camera module 500 or at least one of a wide-angle camera, an ultra-wide-angle camera, a macro camera, a telephoto camera, or an infrared photodiode as a light receiving element. The electronic device 400 may include a light source or a flash (e.g., the flash 204 of FIG. 3) or an infrared laser diode as a light emitting element. In an embodiment, the electronic device 400 may emit infrared laser to the subject and receive the infrared laser reflected by the subject, using the infrared laser diode and infrared photo diode, thereby detecting the distance or depth to the subject. The electronic device 400 may capture the subject using any one or a combination of two or more of the cameras and, as necessary, provide light to the subject using the flash.

Among the cameras, the wide-angle camera, the ultra-wide-angle camera, or a macro camera may have a shorter length in the optical axis direction of the lens(es) as compared to the telephoto camera (e.g., the camera module 500). For example, the telephoto camera (e.g., the camera module 500) having a relatively long focal length may be longer in the overall lens length of the lens(es) 423a, 423b, and 423c than other cameras. The 'overall lens length' may mean the distance from the object-side surface of the first object-side lens to the image plane of the image sensor 411. The object side is considered the side of the object that is being photographed while the image plane, or image side, is the side that receives the light.

The wide-angle camera, the ultra-wide-angle camera, or the macro camera, although the lens(es) are arranged along the direction of the thickness (e.g., the thickness measured in the Z-axis direction of FIG. 4 or 6) of the electronic device 400, the substantial influence on the thickness of the electronic device 400 may be small. For example, the wide-angle camera, the ultra-wide-angle camera, or the macro camera may be disposed such that the direction in which light is incident from the outside to the electronic device 400 and the optical axis direction of the lens(es) are substantially the same.

In contrast, the camera module 500 (e.g., a telephoto camera) has a small angle of view but may be useful for capturing a subject at a greater distance and may include more lenses 421a, 421b, 423a, 423b, and 423c. For example, when the lens(es) 423a, 423b, and 423c of the camera module 500 are arranged in the thickness direction (e.g., the Z-axis direction) of the electronic device 400, the camera module 500 may protrude to the outside of the electronic device 400.

FIGS. 6 and 7 describe a camera module 500. The camera module 500 receives light D1, in a direction that is substantially along the z axis of the electronic device 400. The camera module 500 include refractive members 413, 415. The refractive member 413 refracts light D1 to a direction along the x axis of the electronic device 400. Lenses 423a, 423b, 423c, and 423d are disposed along the x axis of the electronic device 400. Another refractive member 415 refracts light from the x axis to along the z axis to be received by image sensor 411.

In the disclosure, the camera module 500 may include at least one refractive member 413 and 415 that reflects or refracts the incident light IL in a different direction. The light beams IL, RL1 and RL2 may travel substantially along the optical axis O. The optical axis O may be defined by lens groups 421 and 423 and/or the refractive members 413 and 415. For example, the optical axis O may be a straight line connecting the centers of surfaces of the lens groups 421 and 423 and the refractive members 413 and 415. In implementing the telephoto function, in at least a portion of the camera module 500, the lens(es) 423a, 423b, and 423c may be disposed to move forward and backward in the incident direction of light or in the traveling direction of reflected or refracted light, preventing an increase in the thickness of the electronic device 400.

Referring to FIGS. 6 and 7, a folded camera (e.g., the camera module 500) may include a first refractive member 413, a second refractive member 415, an image sensor 411, and/or at least one optical member. In an embodiment, the at least one optical member may be referred to as at least one of a first lens group 421 including first lenses 421a and 421b or a second lens group 423. The second lens group 423 may include second lenses 423a, 423b, and 423c and/or a dummy member 423d.

At least one optical member may guide or focus the light RL1 to the second refractive member 415. The at least one optical member may reduce direct incidence of the light RL1 reflected or refracted to the image sensor 411. In general, the term "optical member" may mean a component capable of transmitting, refracting, scattering, absorbing or reflecting light. In the disclosure, "optical member" will be used as meaning the second lenses 423*a*, 423*b*, and 423*c* or the dummy member 423*d* disposed between the first refractive member 413 and the second refractive member 415, but it should be noted that the term or expression does not limit the embodiments of the disclosure. For example, the first refractive member 413, the second refractive member 415, and/or the first lenses 421*a* and 421*b* (or the first lens group 421) are a kind of the optical member. In the following detailed description, if necessary, the optical member disposed between the first refractive member 413 and the second refractive member 415 may be described separately as second lens(es) and/or dummy member and described or a combination of the second lenses 423*a*, 423*b*, and 423*c* or the dummy member 423*d* may be described as the second lens group 423.

The first refractive member 413 may include, e.g., a prism or a mirror and reflect or refract the light IL, incident in the first direction D1, in a second direction D2 crossing the first direction D1. The first direction D1 may mean a direction in which light IL is incident from the outside to the electronic device 400 or camera module 500 through any one of the transparent areas 387, e.g., when capturing the subject. The first direction D1 may mean the direction of capture, the direction toward the subject, the oriented direction of the camera module 500, or a direction parallel thereto.

The first direction D1 may be parallel to the thickness direction or the Z-axis direction of the electronic device 400. According to an embodiment, when the direction (e.g., the second direction D2) of reflection or refraction of light is perpendicular to the direction of incidence of light (e.g., the first direction D1), it may be easy to design the camera module 500 or the optical path. For example, the second direction D2 may be parallel to the length direction (e.g., the Y-axis direction) or the width direction (e.g., the X-axis direction) of the electronic device 400. However, the structure of the camera module 500 of the disclosure is not limited thereto and may be changed depending on the arrangement and specifications of the camera module 500 or the first refractive member 413 in the electronic device 400.

The second refractive member 415 may include, e.g., a prism or a mirror and reflect or refract the light RL1, which is reflected or refracted by the first refractive member 413 and incident along the second direction D2, in a third direction D3 crossing the second direction D2. In an embodiment, the third direction D3 may be substantially perpendicular to the second direction D2. For example, the third direction D3 may mean a direction parallel to the Z-axis direction. However, the structure of the camera module 500 of the disclosure is not limited thereto and may be changed depending on the arrangement and specifications of the camera module 500 or the second refractive member 415 in the electronic device 400. In an embodiment, the third direction D3 may be substantially parallel to the first direction D1.

The image sensor 411 may be configured to detect the light RL2 which is reflected or refracted by the second refractive member 415 and incident along the third direction D3. For example, the light IL incident from the outside may be detected by the image sensor 411 through the first refractive member 413 and the second refractive member 415. The electronic device 400 or the camera module 500 may obtain a subject image based on the signal or information detected through the image sensor 411. In an embodiment, the image sensor 411 may be disposed substantially parallel to the X-Y plane. For example, when the camera module 500 has an image stabilization function of a structure of moving or shifting the image sensor 411, the image sensor 411 may horizontally move on a plane perpendicular to the first direction D1 or the third direction D3. The image sensor 411 may be positioned behind the refractive member 415. For example, the image sensor 411 may face the exit surface of the refractive member 415.

When the electronic device 400 and/or the camera module 500 performs an image stabilization operation, the image sensor 411 may be shifted in the length direction (e.g., Y-axis direction) or the width direction (e.g., X-axis direction) of the electronic device 400. For example, as the image sensor 411 is disposed on a plane perpendicular to the first direction D1 or the third direction D3, it is possible to easily increase the size of the image sensor 411 and/or easily secure a space for image stabilization operation in the electronic device having a small thickness (e.g., a thickness of about 10 mm or less). When the camera module 500 is used as a telephoto camera, the quality of the captured image may be further enhanced by including an image stabilization function. In an embodiment, when the size of the image sensor 411 increases, the performance of the camera module 500 may further increase.

The camera module 500 may include a lens group (e.g., the first lens group 421 including at least one first lens 421*a* and 421*b*) to guide or focus the light IL incident from the first direction D1 to the first refractive member 413. The at least one optical member may be disposed between the first refractive member 413 and the second refractive member 415, forming a second lens group 423. In an embodiment, the first lens (e.g., the first lens 421*a*) disposed on the side of the object in the first lens group 421 or the camera module 500 may have a positive refractive power. For example, as the first lens 421*a* is configured to focus or align the light IL incident from the outside to the first refractive member 413, the optical system from the first lens 421*a* to the image sensor 411 may be downsized. The first lens group 421 may further include an additional first lens(es) 421*b* to focus or align the light incident from the outside.

The at least one optical member, e.g., the second lens group 423, may include a dummy member 423*d* and a light blocking means 425. The dummy member 423*d* may be disposed in, e.g., the camera module 500 or the electronic device 400 and may have a cylindrical shape extending along the second direction D2 and transmit the light RL1 traveling along the second direction D2. In an embodiment, the dummy member 423*d* may be one of lenses having positive or negative refractive power. In an embodiment, the dummy member 423*d* may be a component formed integrally with any one of the second lenses 423*a*, 423*b*, and 423*c* or the second refractive member 415.

The light blocking member 425 may absorb, scatter, or reflect light. The light blocking member 425 may be formed by etching or black-lacquering, and/or printing or depositing a reflective layer on, at least a portion of the outer circumferential surface of the dummy member 423*d*. The light blocking member 425 may be formed or disposed on at least a portion of the outer circumferential surface of the dummy member 423*d*.

The refractive members 413 and 415 may include light blocking coating (or immersed paint), such that the ratio of the refractive index of the light blocking coating Ria to the refractive index of the raw material Rib meets Equation 7 below.

$$0.6 < \frac{Ria}{Rib} < 1.3 \qquad \text{[Equation 7]}$$

Ria may denote the refractive index of the raw material of the light blocking coating (e.g., the light blocking member 425) (or immersed paint). For example, Ria may denote the refractive index of the raw material except for carbon of the paint of the light blocking coating (or immersed paint).

Rib may denote the refractive index of the raw material of the refractive members 413 and 415. For example, Rib may denote the refractive index of the raw material of the prism forming the effective area 610 of the refractive member (e.g., the refractive member 600 of FIG. 8a or 8b).

A portion of the light reflected or refracted by the first refractive member 413 may be absorbed, scattered, or reflected by the light blocking member 425. The light blocking member 425 may substantially block unintentional light incident to the image sensor 411.

The position of the light blocking member 425 is not limited to the outer circumferential surface of the dummy member 423d. For example, the light blocking member 425 may be disposed on at least a portion of the first refractive member 413 and/or at least a portion of the second refractive member 415. The light blocking member 425 may be positioned in the dummy area (e.g., the dummy area 620 of FIG. 8a or 8b) of the refractive members 413 and 415.

Light may be incident to the camera module 500 from a direction other than the direction of capture or oriented direction, or may travel in a path other than the optical path (e.g., the path indicated by 'RL1' and/or 'RL2' in FIG. 7) during reflection or refraction in the camera module 500 and be detected by the image sensor.

The light incident on the image sensor through an unintended path or an image generated thereby may be denoted as 'ghost light' or 'ghost image.' A ghost image can appear as a faint duplicated of a photographed object that is slightly offset from the photographed object in the image. The ghost image may deteriorate the quality of the image obtained through the camera module 500.

The light blocking member 425 may absorb, scatter, or reflect ghost light (e.g., light reflected or refracted by the first refractive member 413), blocking direct incidence of the ghost light to the image sensor 411. For example, the light which sequentially passes in the first direction D1, second direction D2, and/or third direction D3 from the camera module 500 (e.g., the light along the path indicated by 'IL,' 'RL1,' and 'RL2' of FIG. 7) may be incident on the image sensor 411, and light traveling in another path may be substantially blocked from being incident on the image sensor 411.

The at least one optical member may include at least one second lens 423a, 423b, and 423c that moves back and forth along substantially the same axis as the second direction D2 between the first refractive member 413 and the second refractive member 415. For example, the electronic device 400 or the camera module 500 may adjust the focal length by moving back and forth at least one second lens 423a, 423b, and 423c with respect to substantially the same axis as the second direction D2. A small electronic device, such as a smartphone, may have a thickness of about 10 mm or less and, in this case, the range in which the lens may advance and retreat in the thickness direction may be limited.

The second direction D2 may be substantially parallel to the length direction (e.g., the Y-axis direction of FIG. 4), the width direction (e.g., the X-axis direction of FIG. 4) and/or the X-Y plane. As compared to a general wide-angle camera that moves back and forth in the Z-axis direction for focus adjustment (or focal length adjustment), the range in which the at least one second lens 423a, 423b, and 423c may move back and forth may be large. For example, as the at least one second lens 423a, 423b, and 423c moves back and forth along substantially the same axis as the second direction D2, it is possible to enhance the degree of design freedom in securing a forward/backward movement space for focus adjustment (or focal length adjustment) while enhancing the telephoto performance of the camera module 500.

The electronic device 400 and/or the camera module 500 may further include an infrared cut filter 419. In an embodiment, the infrared cut filter 419 may block light in an infrared or near infrared wavelength band from being incident to the image sensor 411 and may be disposed in any position in the light path between the first lens 421a and the image sensor 411. In an embodiment, the infrared cut filter 419 may be disposed in a position close to the image sensor 411 (e.g., between the image sensor 411 and the second refractive member 415), preventing or suppressing the infrared cut filter 419 from being visually exposed to the outside. In an embodiment, the first refractive member 413, the second refractive member 415, and/or at least one optical member (e.g., the second lens group 423) may include an infrared cut coating layer. In this case, the infrared cut filter 419 may be omitted. In an embodiment, the infrared cut coating layer may be provided on at least one of the image sensor-side surface and the object-side surface of the dummy member 423d or the second refractive member 415. Accordingly, the image sensor 411 may detect light substantially transmitted through the infrared cut filter 419 (or the infrared cut coating layer).

The electronic device 400 and/or the camera module 500 may not include an optical member, e.g., the dummy member 423d. In this case, the light blocking member 425 may be disposed on at least a portion of the infrared cut filter 419.

Although FIGS. 6 and 7 illustrate a structure in which the electronic device 400 and/or the camera module 500 includes two refractive members 413 and 415, the structure of the electronic device 400 and/or the camera module 500 is not limited thereto. For example, in an embodiment, the electronic device 400 may include the first refractive member 413 but may not include the second refractive member 415. The image sensor 411 and/or the infrared cut filter 419 may be positioned substantially parallel to the second lens group 423.

The refractive members 413 and 415 of the disclosure may be selectively designed depending on the structure of the camera module 500. For example, in an embodiment, the refractive member (e.g., the refractive member 415 of FIG. 6) may have a triangular prism shape. In an embodiment, the refractive member (e.g., the refractive member 415 of FIG. 7) may have a trapezoidal prism shape. The shapes of the refractive members 413 and 415 are not limited to the structures shown in the disclosure. For example, if the refractive members 413 and 415 reflect, refract, or transmit light, the refractive members 413 and 415 may have a structure (e.g., a column structure having a diamond-shaped bottom) other than a triangular or trapezoidal prism.

Refractive Member

The refractive member 600 can include an effective area 610 and a dummy area 620. The effective area 610 is configured to refract light. The dummy area 620 is configured to scatter light. The dummy area 620 reduces, if not eliminates, ghost images.

FIG. 8a is a perspective view illustrating a refractive member according to an embodiment of the disclosure. FIG. 8b is a perspective view illustrating a refractive member according to an embodiment of the disclosure. FIG. 9 is a side view illustrating a refractive member according to an embodiment of the disclosure.

Referring to FIGS. 8a, 8b, and 9, the refractive member 600 may include an effective area 610 and a dummy area 620. The term 'effective area 610' may refer to a portion that refracts light toward the image sensor 411. In one embodiment, in designing or arranging the refractive member 600, the effective area 610 may refer to a progress path of light to be incident on the image sensor 411 or a portion through which light passes. For example, light including image information of a subject may be guided to the image sensor 411 via at least a portion of the effective area 610. In an embodiment, a portion of the effective area 610 (e.g., the second surface 600b) may substantially reflect light to be incident on the image sensor 411.

The dummy area 620 may be a part of the refractive member 600 and a part through which light guided to the image sensor 411 does not pass. For example, when light enters the dummy area 620 from an unintended path or an unintended angle direction, the dummy area 620 may be one of the structures that cause internal reflection. The dummy area 620 may be provided on at least a portion of the edge of the effective region 610. Here, the term 'edge of the effective area 610' may refer to a side of the first surface 600a to be described later in contact with the side portion 601, a side of the second surface 600b to be described later in contact with the side portion 601, and/or a side of the third surface 600c to be described later in contact with the side portion 601. In this case, it may be understood that the dummy area 620 is substantially disposed on the side portion 601. In one embodiment, the term 'edge of the effective area 610' may refer to at least a part of the first surface 600a to be described later in contact with the side portion 601, at least a part of the second surface 600b to be described later in contact with the side portion 601, and/or at least a part of the third surface 600c to be described in contact with the side portion 601. In this case, it may be understood that the dummy area 620 is disposed on the side portion 601 and is disposed on a portion P11, P12, P21, P22, P31, and P32 of the first surface 600a, the second surface 600b, and/or the third surface 600c.

In one configuration, the dummy area 620 may scatter or absorb at least a portion of light incident to the dummy area 620 by satisfying conditions for a bidirectional scattering distribution function to be described later. Here, 'scattering or absorbing at least a part of incident light' may be understood as suppressing light incident to the image sensor 411 through an undesigned path by suppressing internal reflection in the dummy area 620. In one embodiment, when the dummy area 620 includes a roughening pattern 621 and/or a nanostructure, at least a portion of the incident light may be scattered. In one embodiment, when a light blocking member (e.g., the light blocking member 425 in FIG. 62) or a light blocking coating is provided on the dummy area 620, at least a part of the incident light may be absorbed by the light blocking member (e.g., the light blocking member 425 in FIG. 6) or the light blocking coating. The light-shielding member or light-blocking coating that absorbs light may be replaced with a paint immersed in the dummy area 620 or may be disposed together with the paint immersed in the dummy area 620. In one embodiment, when the light blocking member or the light blocking coating is combined with a paint immersed in the dummy area 620, the absorption rate of incident light may be improved.

According to an embodiment, when the refractive member 600 has a polygonal (e.g., a square, rhombus, and/or trapezoidal) pillar shape, the dummy area 620 may be disposed on at least a portion of the edge of the effective region 610. For example, the dummy area 620 may be disposed on at least both sides of the refractive member 600 (e.g., the side portion 601 of FIG. 8A or 8B; the first side portion 601a and/or the second side portion 601b). The configuration of the refractive member 600 of FIGS. 8a, 8b and 9 may be identical in whole or part to the configuration of the first protection member 413 and/or the second protection member 415 of FIGS. 6 and 7. For example, the refractive member 600 may reflect or refract at least a portion of the light passing through the optical member (e.g., the first lens group 421 and/or the second lens group 423 of FIG. 6).

The effective area 610 may transmit at least a portion of light or refract at least a portion of light. For example, the effective area 610 may provide a path through which at least a portion of the light transferred from the lens (e.g., the first lens group 421 and/or the second lens group 423 of FIG. 6) passes. The effective area 610 may be formed of a substantially transparent material. The effective area 610 may be referred to as an area where a roughening pattern 621 is not formed in the refractive member 600. The effective area 610 may provide a path through which light (e.g., light IL of FIG. 7) substantially passes. For example, the effective area 610 may be a portion of the refractive member 600 through which the optical axis (e.g., the optical axis O of FIG. 7) passes. For example, the effective area 610 may be positioned in at least a portion of the center portion of the refractive member 600. The light (e.g., light IL of FIG. 7) incident on the camera module 500 may be substantially transferred to the effective area 610.

The effective area 610 may be a portion of the refractive member 600 for adjusting the path of light. For example, the effective area 610 may include surfaces for adjusting the path of light. The effective area 610 may include an incident surface to which light is first transferred among surfaces of the refractive member 600. The incident surface may be referred to as an initial incident surface or a first incident surface.

The effective area 610 may include a reflective surface inclined with respect to the first incident surface of the refractive member 600. The reflective surface may not form a right angle with the incident surface. For example, the reflective surface may reflect at least a portion of the light passing through to the incident surface. According to an embodiment, a plurality of reflective surfaces may be provided on the refractive member 600. For example, according to the shape of the refractive member 600, the effective area 610 may include at least one reflective surface. When a plurality of reflective surfaces are provided, light incident on the refractive member 600 may be reflected or refracted at least twice inside the refractive member 600 and then guided to an image sensor (e.g., the image sensor 411 of FIG. 6 or 7).

The effective area 610 may include an exit surface through which light is emitted last among the surfaces of the refractive member 600. The exit surface may be referred to as a final exit surface or a first exit surface. In an embodiment (e.g., FIGS. 8a and 8b), the first surface 600a may be denoted as an incident surface, the second surface 600b as a reflective surface, and the third surface 600c as an exit surface. For example, the first surface 600a may be disposed to face the subject and may be disposed to cross or substantially perpendicular to light incident from the outside. In an embodiment, the third surface 600c may be disposed to cross or substantially perpendicular to light emitted toward the image sensor 411. In an embodiment, a plurality of second surfaces 600b functioning as reflective surfaces may be provided, and may be guided to the third surface 600c by reflecting or refracting light incident through the first surface 600a. The refractive member 600 may have various shapes (e.g., a triangular prism, a trapezoidal prism, or a rhombic prism). What has been described about the incident surface, the reflective surface, and/or the exit surface may be applied to the refractive member 600 having various shapes.

The incident surface, the reflective surface, or the exit surface will be understood by one of ordinary skill in the art. For example, reflection also occurs on the incident surface where light is incident, but one of ordinary skill in the art may distinguish the incident surface from the reflective surface considering the amount of reflection and incidence of light.

The refractive member 600 may include a component for enhancing light transmission and/or light refraction in the effective area 610. For example, at least one of a low-reflective coating layer or a mirror coating layer may be disposed on the effective area 610. According to an embodiment, materials of the low-reflective coating layer and the mirror coating may be different from that of the refractive member 600.

The refractive member 600 may reflect or refract light 1 to 5 times. The number of times the refractive member 600 reflects or refracts light may be changed based on the shape of the refractive member 600.

The dummy area 620 may reduce light reflection. The term 'dummy area 620 reduces the reflection of light' may be understood as suppressing progress toward the image sensor 411 by scattering or absorbing light incident on the dummy area 620. In an embodiment, the dummy area 620 may include a roughening pattern 621. Due to be provided with the roughening pattern 621, the reflectance of the dummy area 620 may be lower than the reflectance of the effective region 610, or at least a portion of the light incident on the dummy area 620 may be scattered. For example, the roughening pattern 621 may scatter at least a portion of light incident on the dummy area 620 or may at least suppress progress to an image sensor (e.g., the image sensor 411 of FIG. 7).

The roughening pattern 621 may refer to a plurality of depressions or protrusions formed in the refractive member 600. The roughening pattern 621 may be referred to as a corroded area or corroded surface. The roughening pattern 621 may be referred to as an irregularity pattern including a plurality of depressions and/or a plurality of protrusions. The dummy area 620 may be a portion of the refractive member 600 required for shaping the refractive member and/or coupling with another component of the electronic device (e.g., the electronic device 200 of FIG. 2) or fixing the position of the refractive member 600. In an embodiment, the dummy area 620 may be partially disposed on the first surface 600a, the second surface 600b, and/or the third surface 600c. For example, the dummy area 620 may be partially disposed on the side end of the effective region 610 on the first surface 600a, the second surface 600b, and/or the third surface 600c. The dummy area 620 may be referred to as an ineffective area. The roughening pattern 621 may be referred to as a fine pattern. The roughening pattern 621 may be formed by corrosion or etching (e.g., dry etching).

According to an embodiment, since a nanostructure replacing the roughening pattern 621 is provided, light incident on the dummy area 620 may be absorbed or scattered. In an embodiment, a roughening pattern 621 and a nanostructure are combined in the dummy area 620 to scatter light incident on the dummy area 620, thereby further suppressing progress toward the image sensor 411.

The degree of reflection of the light incident on the dummy area 620 may be reduced due to the roughening pattern 621 and/or nanostructure, thereby reducing flare in the image obtained from the camera module (e.g., the camera module 500 of FIG. 6). For example, when the light incident on the side portion 601 and/or the edge of the refractive member 600 is reflected, unintended reflected light rays (or unintended refracted light rays) may be transferred to the image sensor (e.g., the image sensor 411 of FIG. 7), reducing the quality of the image obtained from the image sensor 411. As described later, the depth or etching amount of the roughening pattern 621 may be about 1 μm. The roughness average (Ra) of the dummy area 620 may be about 1.0 μm or more. The term 'roughness average (Ra)' may be, for example, a reference to the average roughness of the center line of the surface of an object or structure.

The dummy area 620 may form at least a portion of an outer surface of the refractive member 600. For example, the dummy area 620 may be positioned on at least a portion of the side portion 601 or the edge of the refractive member 600 (e.g., edge(s) of the first surface 600a, the second surface 600b, and/or the third surface 600c). The dummy area 620 may surround at least a portion of the effective area 610. The side portion 601 may be referred to as a portion of the refractive member 600 through which the optical axis (e.g., the optical axis O in FIG. 7) does not pass. For example, light to be guided to the image sensor 411 may progress, inside the refractive member 600, a region (e.g., the effective area 610) between both edges of the refractive member 600 and may not pass through the dummy area 620. The dummy area 620 may be substantially parallel to the optical axis O. However, since the light to be guided to the image sensor 411 does not substantially pass through the dummy area 620, the arrangement of the dummy area 620 with respect to the optical axis O may be variously changed. In the arrangement of the dummy area 620, specifications required by the electronic device 400 or the camera module 500 of FIG. 6 may be considered without interfering with the progress path of light to be guided to the image sensor 411.

The optical properties or optical characteristics of the dummy area 620 may be different from those of the effective area 610 due to the roughening pattern 621 and/or nanostructure. The first surface roughness of the dummy area 620 may be larger than the second surface roughness of the effective area 610. The first surface reflectance of the dummy area 620 may be lower than the second surface reflectance of the effective area 610. The first surface reflectance of the dummy area 620 may be about 2.0% or less. For example, the first surface reflectance of the dummy area 620 may be about 0.5% or less. The second surface reflectance of the effective area 610 may exceed about 2.0%.

The dummy area 620 may be a path through which the optical axis O does substantially not pass. For example, the dummy area 620 may be at least partially disposed on at least a portion of the side surface (e.g., the side portion 601) of the refractive member 600.

The refractive member 600 may have substantially a triangular pillar shape or a triangular pyramid shape. For example, the refractive member 600 may include a first surface 600a facing outward of the electronic device (e.g., the electronic device 200 of FIG. 2), a second surface 600b configured to reflect or refract at least a portion of the light passing through the first surface 600a, and a third surface 600c for transferring at least a portion of the light reflected or refracted by the second surface 600b to the image sensor (e.g., the image sensor 411 of FIG. 7). The first surface 600a may be substantially perpendicular to the third surface 600c.

The second surface 600b may extend from the first surface 600a to the third surface 600c. The second surface 600b may be inclined with respect to the first surface 600a and the third surface 600c. In an embodiment, the number of the first surface 600a, the second surface 600b, and/or third surface 600c, or the relative arrangement (e.g., angle to each other) of the first surface 600a, the second surface 600b, and/or third surface 600c is/are not limited to the above-described examples, and may be appropriately changed according to the design specification of the electronic device (e.g., the electronic device 101, 200, 400 of FIGS. 1 through 5) and/or the camera module (e.g., camera module 500 of FIG. 6). For example, when the refractive member 600 is in the shape of a parallelogram pillar, a rhombus pillar, or a trapezoidal pillar, multiple surfaces (e.g., the second surface 600b) that reflect or refract light may be provided.

The effective area 610 may provide a light path (e.g., a path through which light is transmitted or progress). The effective area 610 may provide an incident surface, a reflective surface, and an exit surface of the refractive member 600. For example, when light is transferred to the refractive member 600, at least a portion of the first surface 600a of the refractive member 600 may be denoted as an incident surface, at least a portion of the second surface 600b of the refractive member 600 as a reflective surface, and at least a portion of the third surface 600c of the refractive member 600 as an exit surface.

The refractive member 600 may include a side portion 601 positioned defined by the first surface 600a, the second surface 600b, and the third surface 600c. For example, the side portion 601 may be substantially an area (or a surface) surrounded by a portion of an edge of the first surface 600a, a portion of an edge of the second surface 600b, and a portion of an edge of the third surface 600c, and may be referred to as a portion of the surface of the refractive member 600. The side portion 601 may include a first side surface 601a and a second side surface 601b opposite to the first side surface 601a.

According to an embodiment, a portion of the dummy area 620 may be positioned on the side portion 601. For example, the dummy area 620 may be at least partially positioned on at least one of the first side surface 601a or the second side surface 601b. According to an embodiment, since the dummy area 620 is positioned on the side portion 601, the degree of transfer of light incident on the side portion 601 from an outside of the refractive member 600 or an inside of the refractive member 600 to the image sensor 411 may be reduced. For example, the dummy area 620 and/or the side portion 601 may suppress stray light incident to the image sensor such that the dummy area 620 and/or the side portion 601 substantially absorb or scatter the incident light.

The refractive member 600 may include a substantially transparent material. The refractive member 600 may be formed of glass. The roughening pattern 621 may be formed by a laser. For example, the roughening pattern 621 may be referred to as a protruding or recessed shape formed on the glass of the refractive member 600. In the disclosure, the refractive member 600 has been described as having a triangular pillar shape or a triangular pyramid shape, but the shape of the refractive member 600 is not limited thereto. For example, the refractive member 600 may have a pillar shape in which the side portion 601 has a square (e.g., trapezoidal or rectangular) shape. The refractive member 600 may have a diamond-shaped cross section. For example, the refractive member 600 may have a pillar shape in which the side portion 601 has a diamond shape.

The refractive member 600 may be formed of a resin. For example, the refractive member 600 may include plastic that may be manufactured using a mold. The roughening pattern 621 may be formed by a mold. For example, the roughening pattern 621 may be formed by a mold including protrusions corresponding to the roughening pattern 621.

The refractive member 600 may include a light blocking coating disposed on the dummy area 620 or a paint immersed into the dummy area 620. The configuration of the light blocking coating may be identical in whole or part to the configuration of the light blocking member 425 of FIG. 6. The light blocking coating or the immersed paint may reduce the degree of reflection of the light incident on the dummy area 620. For example, the light absorption of the refractive member 600 where the light blocking coating or the immersed paint is positioned may be higher than the light absorption of the area where the light blocking coating or the immersed paint is not present, and the light transmittance of the refractive member 600 where the light blocking coating or the immersed paint is positioned may be lower than the light transmittance of the area where the light blocking coating or the immersed paint is not present. The light-blocking coating (e.g., black lacquer) or the immersed paint may be positioned in the dummy area 620 where the roughening pattern 621 is formed. Due to the roughening pattern 621, the occurrence of flare may be reduced and, due to the light blocking coating or the immersed paint, light absorption may be increased and light transmittance may be decreased.

The refractive member 600 may include a chamfered area 630 to reduce breakage of the refractive member 600. The chamfered area 630 may be referred to as a portion of a cut edge of the refractive member 600. The dummy area 620 may be partially positioned in the chamfered area 630. The dummy area 620 may form at least a portion of the chamfered area 630. Since the dummy area 620 is positioned in the chamfered area 630, the degree of reflection of the light incident on the chamfered area 630 may be reduced.

The dummy area 620 may have a designated bidirectional scattering distribution function (BSDF) to reduce internal reflection. According to an embodiment, internal reflection may be referred to as a phenomenon in which light entering the inside of the camera module (e.g., the camera module 500 of FIG. 6) is unintentionally reflected by a component. Due to internal reflection, the quality of the photo captured by the camera module 500 may be reduced, or a stain or flare may occur. According to an embodiment, a phenomenon (e.g., flare) due to internal reflection may reduce as the surface reflectance of the refractive member 600 decreases, and the surface etching amount increases. For example, when the surface reflectance of the dummy area 620 of the refractive member 600 is about 2.0% or less and the surface etching amount (e.g., the depth of the roughening pattern 621) is about 1 μm or more, flare may be reduced. In an embodiment, when the surface etching amount of the dummy area 620 (e.g., the depth of the roughening pattern 621) is approximately 50 μm, the surface reflectance of the dummy area 620 is controlled to be approximately 2.0% or less (e.g., approximately 0.5%), and the flare of the image obtained through the image sensor 411 may be substantially removed. The values mentioned for surface reflectance or surface etching are illustrative and may vary depending on design parameters, such as the relative location of the image sensor 411 and refractive member 600, or presence of the light-shielding coating (or the immersed paint). For example, it is noted that the values mentioned regarding the surface reflectance or surface etching amount do not limit the embodiment(s) of the present disclosure.

The scattering coefficient (BSDF) of the dummy area 620 may be set to meet the following equations. The scattering coefficient (BSDF) may be referred to as the sum of the bidirectional reflectance distribution function (BRDF) and the bidirectional transmittance distribution function (BTDF). The scattering coefficient may be referred to as a bidirectional scattering distribution function (BSDF). The scattering coefficient may be a function for determining how much light is reflected or transmitted when light is incident on an object. The bidirectional reflectance distribution function may be a function for determining in which direction light is reflected. The bidirectional transmittance distribution function may be a function for determining in which direction light is transmitted. The first scattering coefficient of the dummy area 620 may be lower than the second scattering coefficient of the effective area 610.

The scattering coefficient of the dummy area 620 may meet Equation 1 below. In an embodiment, the scattering coefficient of the dummy area 620 may be referred to as a bidirectional reflectance distribution function. For example, when the effect of the bidirectional transmittance distribution function on the bidirectional scattering distribution function is insignificant, the scattering coefficient can be determined substantially by the bidirectional reflectance distribution function.

$$BSDF = \frac{b\sqrt{1+\left(\left(\frac{B-B_0}{l \times g^n}\right)^S\right)^2}}{g^m}$$ [Equation 1]

In Equation 1 above, B−B0 may denote an angular difference in scattered light in a sine direction. For example, B may be the angle of the scattered light, and B0 may be the reference angle. The reference angle may be an 0.01 radian (about 0.57 degrees)-inclined angle from the reflective surface.

g may denote the average (e.g., an arithmetic average value) of the angle of scattered light in the cosine direction and the angle of incident light in the cosine direction. b may denote the BSDF value at the reference angle. S may denote the angle of the BSDF. For example, S may mean the angle of the scattering coefficient of reflected and scattered light and the scattering coefficient of incident light in the log-log plot. 1 may denote the angle at which a change in reflected light relative to incident light starts. For example, 1 may be denoted as the selective angle of specular reflection at which the scattering coefficient rolls over to a constant value. m may denote the cosine power. n may denote the angle power. According to an embodiment, Equation 1 which means the scattering coefficient may be interpreted as a modified expression of the Harvey-Shack model. One of ordinary skill in the art will understand Equation 1.

According to an embodiment, b indicating the scattering coefficient value at the reference angle may meet Equation 2 below.

$$0.05 < b < 0.5$$ [Equation 2]

According to an embodiment, in the log-log plot, S, which refers to the angle of the scattering coefficient of reflected scattered light and the scattering coefficient of incident light, may meet Equation 3 below. In Equation 3, the unit of S may be degrees.

$$-6.0 < S < -0.05$$ [Equation 3]

According to an embodiment, 1, which refers to the angle at which a change in reflected light relative to incident light starts, may meet Equation 4 below. In Equation 4, the unit of 1 may be degrees.

$$0.02 < l < 1.9$$ [Equation 4]

According to an embodiment, b, S, and/or 1 may be changed according to the design of the camera module 500. According to an embodiment, b may be 0.05 to 0.1. According to an embodiment, S may be −4.2 to −0.05. According to an embodiment, S may be −4.0 to −0.5.

According to an embodiment, m indicating cosine power may meet Equation 5 below.

$$0 < m < 1.6$$ [Equation 5]

According to an embodiment, n, which refers to angle power, may meet Equation 6 below.

$$1.1 < n < 9.0$$ [Equation 6]

The cosine power and/or the angle power may be changed according to the design of the camera module 500. According to an embodiment, m may be in a range from about 0.0001 to about 1.0. According to an embodiment, n may be in a range from about 1.15 to about 1.56.

The structure of the refractive member 600 of FIGS. 8a, 8b and/or 9 may be used together with the structure of the camera module 500 of FIGS. 6 and/or 7.

FIGS. 10A to 10D are enlarged views of an optical member and views of captured images according to an embodiment of the disclosure. FIG. 11 is a graph illustrating surface reflectance of an optical member according to an embodiment(s) of the disclosure.

Figures 10A, 10B:
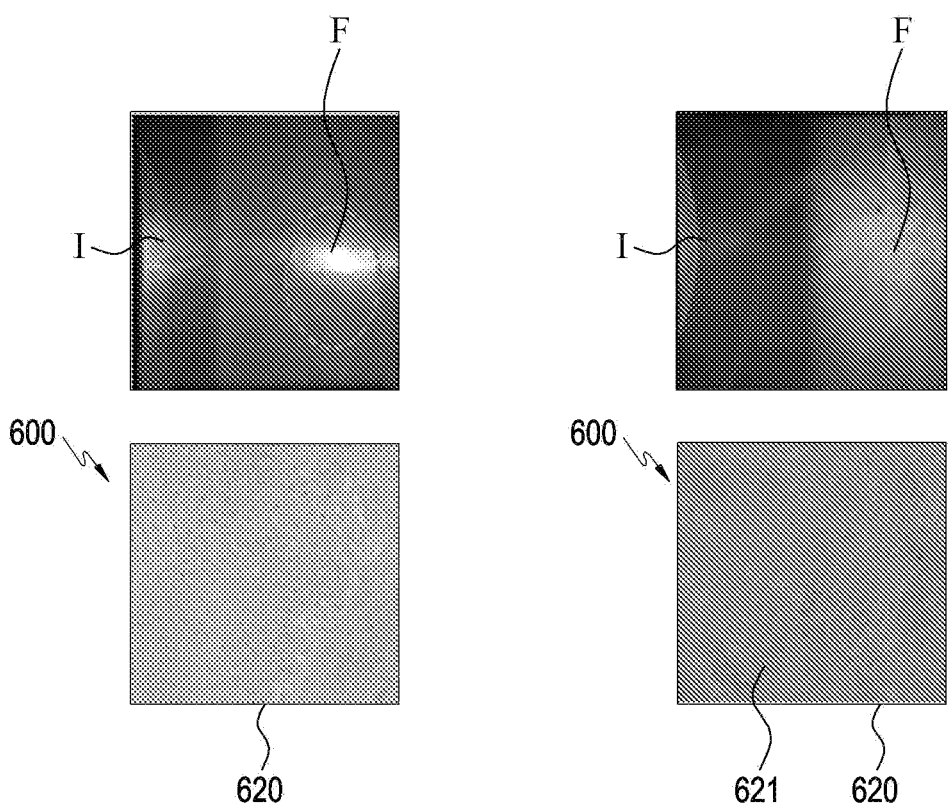
FIGS. 10A to 10D are enlarged views of an optical member and views of captured images according to an embodiment of the disclosure.
Figures 10C, 10D:
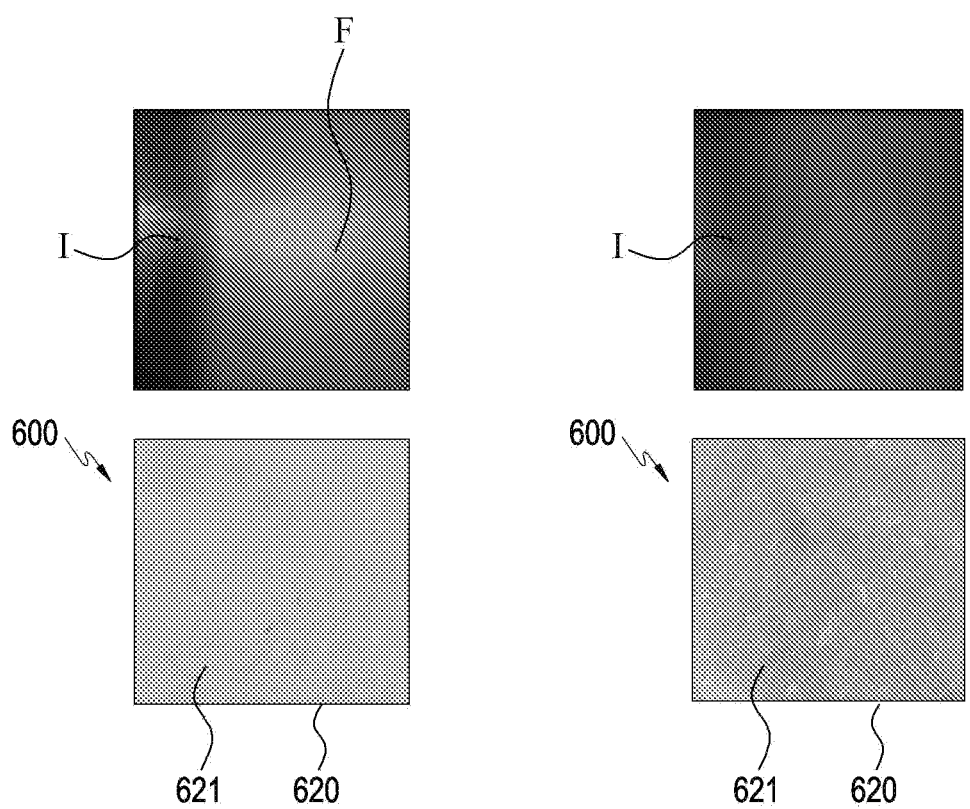
Figure 11:
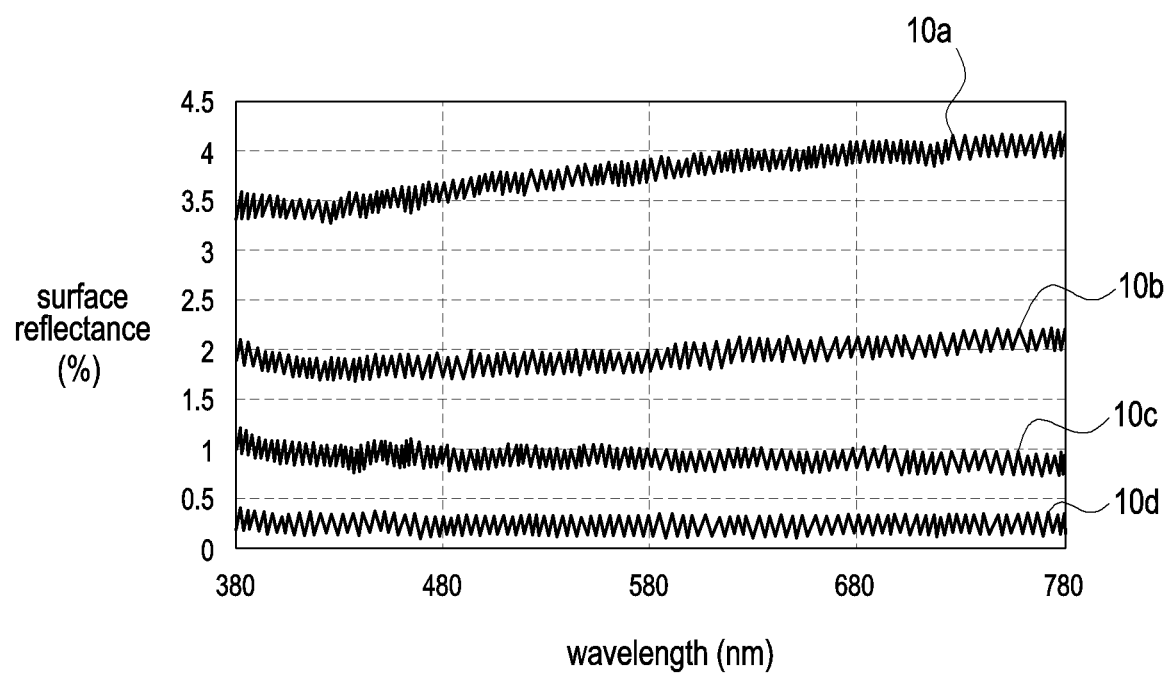
FIG. 11 is a graph illustrating surface reflectance of an optical member according to an embodiment(s) of the disclosure.

Referring to FIGS. 10A, 10B, 10C and/or 10D, the refractive member 600 may include a dummy area 620 where a roughening pattern 621 is positioned. The configuration of the dummy area 620 of FIGS. 10A, 10B, 10C and/or 10D may be identical in whole or part to the configuration of the dummy area 620 of FIGS. 8a and 8b. In FIG. 11, the graph indicated by '10a' measures and illustrates the surface reflectance in the dummy area 620 of FIG. 10a, the graph indicated by '10b' measures and illustrates the surface reflectance in the dummy area 620 of FIG. 10b, the graph indicated by '10c' measures and illustrates the surface reflectance in the dummy area 620 of FIG. 10c, and the graph indicated by '10d' measures the surface reflectance in the dummy area 620 of FIG. 10d.

The flare F generated in the image I captured by the camera module may be suppressed based on the roughening pattern 621. The refractive member 600 of FIG. 10A illustrates the dummy area 620 that does not include a roughening pattern. The refractive member 600 of FIGS. 10B, 10C and 10D illustrates a dummy area 620 that includes a roughening pattern 621. The size of the flare F generated in the captured image I in FIG. 10A may be larger than the size of the flare F generated in the captured image I in FIGS. 10B and 10C.

The size of the flare F may be determined based on the depth of the roughening pattern 621. The depth of the roughening pattern 621 may be formed in various ways. For example, FIG. 10B includes a roughening pattern 621 having a depth of about 14 μm. FIG. 10C includes a roughening pattern 621 having a depth of about 6 μm. FIG. 10D includes a roughening pattern 621 having a depth of about 52 μm.

The roughening pattern 621 of FIG. 10B is formed deeper than the roughening pattern 621 of FIG. 10C, but has a higher surface reflectance. It is expected that factors such as the shape of grooves and protrusions, the arrangement density of grooves and protrusions, and/or the surface reflectance measurement position have a significant impact on the surface reflectance when the depth difference of the roughening pattern 621 is not large. For example, as compared through the surface reflectance 10b and 10d of the dummy area 620 of FIG. 10b and the dummy area 620 of FIG. 10d, the surface reflectance may generally decrease as the depth of the roughening pattern 621 increases. According to an embodiment, as the depth of the roughening pattern 621 increases, the size of the flare F generated in the image I may decrease. For example, the size of the flare F of the image I captured by the refractive member 600 of FIG. 10D may be smaller than the size of the flare F of the image I captured by the refractive member 600 of FIG. 10C.

According to an embodiment, referring to FIGS. 10a, 10b, 10c, 10d, and/or 11, a roughening pattern 621 having a depth of about 1 μm or more is provided to the dummy area 620 to suppress a flare phenomenon in the obtained image, and the surface reflectance may be controlled to be about 2% or less by including the roughening pattern 621 in the dummy area 620. In an embodiment, when the depth of the roughening pattern 621 is approximately 50 μm or more, flare may be substantially removed from the obtained image. When the depth of the roughening pattern 621 is approximately 50 μm, the surface reflectance of the dummy area 620 may be controlled to be approximately 0.5% or less. For example when the roughening pattern 621 has a depth equal to or larger than a designated depth, the flare F may not substantially occur. For example, the image I captured by the refractive member 600 of FIG. 10D may have no flare F.

Figure 12:
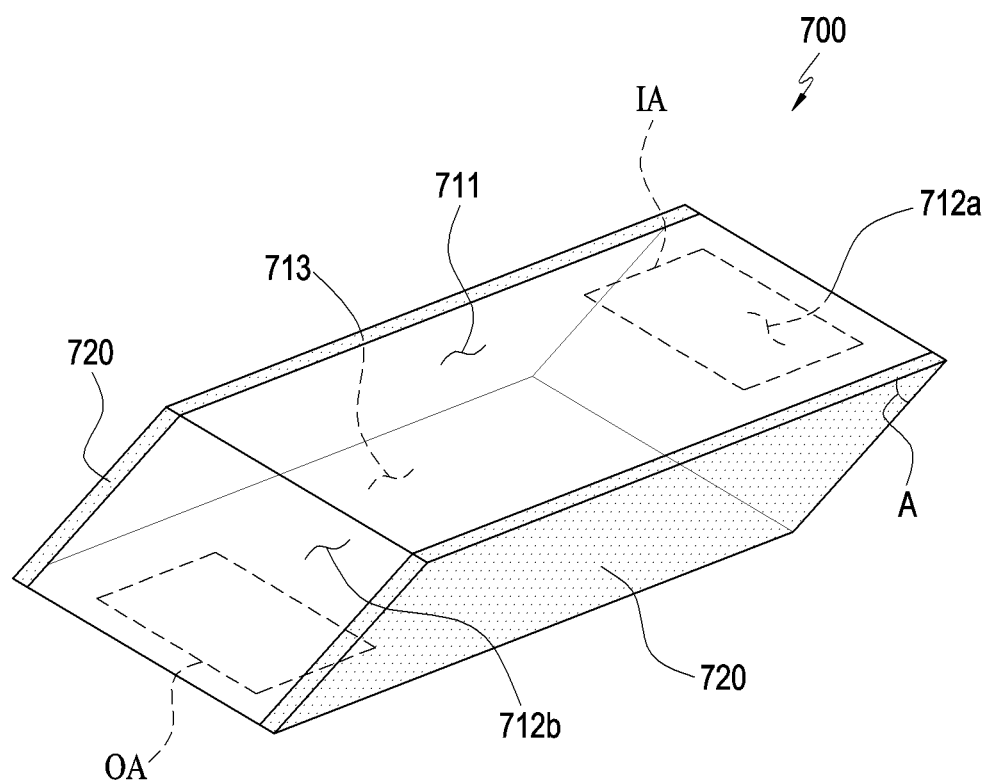
FIG. 12 is a perspective view illustrating a refractive member according to an embodiment of the disclosure.

FIG. 12 is a perspective view illustrating a refractive member according to an embodiment of the disclosure. In FIG. 12, some reference numbers for the configuration of the refractive member are omitted for simplicity of the drawings, and a configuration corresponding to the omitted reference numbers may be described with reference to FIG. 8A or FIG. 8B.

Referring to FIG. 12, the refractive member 700 may include a first surface 711 functioning as an incident surface, second surfaces 712a and 712b functioning as reflective surfaces, and a third surface 713 functioning as an exit surface. In an embodiment, a dummy area 720 may be disposed on at least a portion of the edges of the first surface 711, the second surfaces 712a, 712b, and/or the third surface 713. Although a reference number is not assigned, a side portion (e.g., the first side surface 601a and the second side surface 601b of FIG. 8A or 8B) of the refractive member 700 may be substantially a part of the dummy area 720. Similar to the above-described embodiment(s), the light guided to the image sensor (e.g., the image sensor 411 of FIG. 7) may be emitted through the third surface 713 through a portion of the refractive member 700 (e.g., the effective region 610 of FIG. 8A or 8B) between the dummy areas 720. In one embodiment, the dummy area 720 may satisfy the conditions presented through the above-described equations by at least partially including a roughening pattern (e.g., roughening pattern 621 of FIG. 8A or 8B) and/or a nanostructure. For example, light incident on the dummy area 720 may be scattered (or absorbed) by a roughening pattern and/or nanostructure.

The first surface 711 is a surface disposed to face an external space or a lens (e.g., the first lens group 421 or the second lens group 423 of FIG. 7) and may function as an incident surface in the refractive member 700. In an embodiment, light may be incident on the refractive member 700 from the outer space or via the lens(s) through an area illustrated as 'IA' in the first surface 711. In an embodiment, light incident into the refractive member 700 through the first surface 711 may be sequentially reflected by the second surface indicated by '712a' (hereinafter referred to as '2-1 surface 712a') and the second surface indicated by '712b' (hereinafter referred to as '2-2 surface 712b'), and guided to the third surface 713. The third surface 713 is a surface disposed to face the outer space of the refractive member 700 or the image sensor 411 and may function as an exit surface in the refractive member 700. In an embodiment, light may be emitted from the inside of the refractive member 700 toward the outer space or the image sensor 411 through an area illustrated as 'OA' in the third surface 713.

According to an embodiment, light reflected from the 2-1 surface 712a may be additionally reflected inside the refractive member 700 before reaching the 2-2 surface 712b. For example, light guided to the image sensor 411 is incident into the refractive member 700 through the incident area IA, and may be sequentially reflected by the 2-1 surface 712a, the first surface 711, the third surface 713 and/or the 2-2 surface 712b in the refractive member 700, and then may be emitted through the emitting area OA. Such a guide path or a reflection path may be implemented using an inclination angle (e.g., an angle A between the first surface 711 and the 2-1 surface 712a) formed by the first surface 711, the second surfaces 721b, and/or the third surface 713).

According to an embodiment, light incident from the outside of the refractive member 700 or from the inside of the refractive member 700 to the dummy area 720 may cause flare to be generated in the obtained image. For example, the light to be focused on the image sensor 411 using the refractive member 700 is guided substantially through the area between the dummy areas 720 (e.g., the effective area 610 of FIG. 8A or 8B) and the quality of the subject image may be degraded when the light incident to the dummy area 720 reaches the image sensor 411. In an embodiment, the dummy area 720 may suppress the generation of flares in the obtained image by having a light scattering (or light absorption) tendency such as a roughening pattern (e.g., roughening pattern 621 of FIG. 8A or 8B) and/or nanostructure.

The refractive member 700 may be implemented by coupling another refractive member having a polygonal pillar shape to the refractive member 600 of FIG. 8A or 8B. For example, the refractive member 700 of the above-described embodiment may be implemented by combining two or more different prisms. At least one of two or more different prisms may include the dummy area of the above-described embodiment. For example, the refractive member according to an embodiment of the present disclosure may be implemented by combining two or more prisms, and at least one of the two or more prisms may include a dummy area to scatter or absorb light passing or transmitting through the ineffective region.

In the disclosure (e.g., FIGS. 2 to 4), a mobile phone has been described, but the disclosure is not limited thereto. For example, the contents of the disclosure may be applied to an electronic device including a refractive member (e.g., the refractive member 600 of FIG. 8A or 8B) in a folded zoom structure (e.g., a telephoto camera). The electronic device may be a wearable device, a digital camera, or a drone.

According to an embodiment of the disclosure, the refractive member 600 of the disclosure may include a roughening pattern 621 formed on a portion where light reflection may occur (e.g., an edge and/or side portion 601 of the refractive member 600). Due to the roughening pattern 621, flare in the image obtained by the refractive member 600 may be mitigated. The roughening pattern 621 may be replaced with a nanostructure provided in the dummy region 620. In an embodiment, the roughening pattern 621 and nanostructure may be combined to satisfy at least one of the conditions presented through the above-described equations, thereby suppressing generation of flares in the obtained image.

According to an embodiment of the disclosure, a camera module (e.g., the camera module 500 of FIG. 6) may comprise a refractive member (e.g., the first refractive member 413, the second refractive member 415 of FIG. 6, and/or the refractive member 600 of FIG. 8A or 8B) configured to reflect or refract at least a portion of light received by the camera module, and an image sensor (e.g., the image sensor 411 of FIG. 6) configured to detect at least a portion of light reflected or refracted by the refractive member. The refractive member may include an effective area (e.g., the effective area 610 of FIG. 8A or 8B) configured to provide a path of the light and a dummy area (e.g., the dummy area 620 of FIG. 8A or 8B) disposed at a portion of an edge of the effective area.

According to certain embodiments, the dummy area is configured to scatter at least a part of the light incident into the dummy area by satisfying the following Equation 1, Equation 2, Equation 3, and Equation 4 for a bidirectional scattering distribution function. [Equation 1]

$$BSDF = \frac{b\sqrt{1+\left(\left(\frac{B-B_0}{l \times g^n}\right)^S\right)^2}}{g^m}.$$ [Equation 1]

B−B0 may denote an angular difference in scattered light in a sine direction. g may denote an average of an angle of scattered light in a cosine direction and an angle of incident light in the cosine direction. b may denote a BSDF value at a reference angle, and S may denote an angle of the BSDF. 1 may denote the angle at which a change in reflected light relative to incident light starts. m may denote the cosine power. n may denote the angle power. [Equation 2] 0.05<b<0.5. [Equation 3] −6.0<S<−0.05. [Equation 4] 0.02<l<1.9. The dummy area may be set to meet at least one of Equation 5 or Equation 6 below. [Equation 5] 0<m<1.6. [Equation 6] 1.1<n<9.0

According to an embodiment, the dummy area may include at least one of a nanostructure disposed on a surface of the refractive member or a roughing pattern with a surface roughness of 1.0 μm or more.

According to an embodiment, the refractive member may comprise a prism including a first surface (e.g., the first surface 600a of FIG. 8A or 8B) configured to reflect, refract, or transmit the light and a second surface (e.g., the second surface 600b of FIG. 8A or 8B) configured to reflect or refract at least a portion of the light passing through the first surface.

According to an embodiment, the refractive member may include a first side surface (e.g., the first side surface 601a of FIG. 8A or 8B) and a second side surface (e.g., the second side surface 601b of FIG. 8A or 8B) at least partially defined by the first surface and the second surface. The second side surface can be opposite to the first side surface. In an embodiment, at least a portion of the dummy area may be positioned on at least one of the first side surface or the second side surface.

According to an embodiment, the refractive member may comprise a light blocking coating (e.g., the light blocking member 425 of FIG. 6) disposed on the dummy area, and the light blocking coating is configured to absorb light incident to the dummy area.

According to an embodiment, the refractive member may include at least one of a mirror coating layer or a low-reflective coating layer disposed on the effective area.

According to an embodiment, the refractive member may include a chamfered area (e.g., the chamfered area 630 of FIG. 9) positioned at an edge of the refractive member. The dummy area may be positioned in the chamfered area.

According to an embodiment, the refractive member may include glass and the dummy area includes a roughening pattern.

According to an embodiment, the refractive member may include a resin and the dummy area includes a roughening pattern.

According to an embodiment, the image sensor may be positioned behind the refractive member.

According to an embodiment, the refractive member may be configured to reflect or refract light 1 to 5 times.

According to an embodiment, a scattering coefficient of the dummy area may be lower than a scattering coefficient of the effective area.

According to an embodiment, a surface reflectance of the dummy area may be lower than a surface reflectance of the effective area. A surface roughness of the dummy area may be higher than a surface roughness of the effective area.

According to an embodiment, a surface reflectance of the dummy area of the refractive member may be 2.0% or less.

According to an embodiment of the disclosure, an electronic device (e.g., the electronic device 200 of FIG. 2) may comprise a housing (e.g., the housing 210 of FIG. 2) and a camera module (e.g., the camera module 500 of FIG. 6) at least a portion of which is disposed in the housing. The camera module may include an optical member (e.g., the first lens group 421 and/or the second lens group 423 of FIG. 6) including at least one lens (e.g., the first lens 421a or 421b of FIG. 6 and/or the second lens 423a, 423b, or 423c of FIG. 6), a refractive member (e.g., the first refractive member 413 or second refractive member 415 of FIG. 6 and/or the refractive member 600 of FIG. 8A or 8B) configured to reflect or refract at least a portion of light, and an image sensor (e.g., the image sensor 411 of FIG. 6) configured to detect at least a portion of light reflected or refracted by the refractive member. The refractive member may include an effective area (e.g., the effective area 610 of FIG. 8A or 8B) configured to provide a path of the light and a dummy area (e.g., the dummy area 620 of FIG. 8) disposed on at least a portion of an edge of the effective area. The dummy area is configured to scatter at least a part of the light incident into the dummy area According to an embodiment, the dummy area may satisfy equations 1-4 for a bidirectional scattering distribution function.

$$BSDF = \frac{b\sqrt{1+\left(\left(\frac{B-B_0}{l \times g^n}\right)^S\right)^2}}{g^m}.$$ [Equation 1]

B−B0 may denote an angular difference in scattered light in a sine direction. g may denote an average of an angle of scattered light in a cosine direction and an angle of incident light in the cosine direction. b may denote a BSDF value at a reference angle, and S may denote an angle of the BSDF. 1 may denote the angle at which a change in reflected light relative to incident light starts. m may denote the cosine power. n may denote the angle power. [Equation 2] 0.05<b<0.5. [Equation 3] −6.0<S<−0.05. [Equation 4] 0.02<l<1.9.

The dummy area may be set to meet at least one of Equation 5 or Equation 6 below. [Equation 5] 0<m<1.6. [Equation 6] 1.1<n<9.0.

According to an embodiment, the dummy area may include a roughening pattern with a depth of 1.0 μm or more, and the surface reflectance of the dummy area may be 2.0% or less.

According to an embodiment, the refractive member may include a first surface (e.g., the first surface 600a of FIG. 8A or 8B) facing the optical member, a second surface (e.g., the second surface 600b of FIG. 8A or 8B) configured to reflect or refract at least a portion of light passing through the first surface, and a third surface (e.g., the third surface 600c of FIG. 8A or 8B) for transferring at least a portion of light reflected or refracted by the second surface to the image sensor. The refractive member may include a first side surface (e.g., the first side surface 601a of FIG. 8A or 8B) and a second side surface (e.g., the second side surface 601b of FIG. 8A or 8B) opposite to the first side surface at least partially defined by the first surface, the second surface, and the third surface. At least a portion of the dummy area may be positioned on the first side surface and the second side surface.

The refractive member may include a chamfered area (e.g., the chamfered area 630 of FIG. 8A or 8B) positioned at an edge of the refractive member. At least a portion of the dummy area may be positioned in the chamfered area.

According to an embodiment of the disclosure, a camera module (e.g., the camera module 500 of FIG. 6) may comprise an optical member (e.g., the first lens group 421 and/or second lens group 423 of FIG. 6) including at least one lens (e.g., the first lens 421a or 421b of FIG. 6 and/or the second lens 423a, 423b, or 423c of FIG. 6), a refractive member (e.g., the first refractive member 413 or second refractive member 415 of FIG. 6 and/or the refractive member 600 of FIG. 8A or 8B) configured to reflect or refract at least a portion of light and an image sensor (e.g., the image sensor 411 of FIG. 6) configured to detect at least a portion of light reflected or refracted by the refractive member and positioned behind the refractive member. The refractive member may include an effective area (e.g., the effective area 610 of FIG. 8A or 8B) including an incident surface (e.g., the incident surface 600a of FIG. 8A or 8B), a reflective surface (e.g., the reflective surface 600b of FIG. 8A or 8B), and an exit surface (e.g., the exit surface 600c of FIG. 8A or 8B) and a dummy area (e.g., the dummy area 620 of FIG. 8A or 8B) including a corroded surface (e.g., the roughening pattern 621 of FIG. 8A or 8B). A surface reflectance of the dummy area may be 2.0% or less, and a surface roughness of the corroded surface may be 1.0 μm or more. A surface reflectance of the effective area may exceed 2.0%, and a surface roughness of the effective area may be less than 1.0 μm.

It is apparent to one of ordinary skill in the art that the camera module including a refractive member and the electronic device including a refractive member according to the disclosure as described above are not limited to the above-described embodiments and those shown in the drawings, and various changes, modifications, or alterations may be made thereto without departing from the scope of the disclosure.

What is claimed is:

1. A camera module comprising:
an image sensor;
a lens group including one or more lenses; and
a prism configured to reflect or refract light passed through the lens group such that at least one portion of the light is focused to the image sensor, the prism including:
a first rectangular surface on which the light passed through the lens group is incident, the first rectangular surface including a first side and a second side opposite to each other and having a first length, and a third side and a fourth side opposite to each other and having a second length longer than the first length;
a second rectangular surface extended as adjacent to the second side such that the second rectangular surface is angled with respect to the first rectangular surface;
a third rectangular surface extended as adjacent to a side of the second rectangular surface substantially parallel with the second side such that the third rectangular surface is angled with respect to the second rectangular surface and substantially parallel with the first rectangular surface;
a fourth rectangular surface extended as adjacent to a side of the third rectangular surface substantially parallel with the second side such that the fourth rectangular surface is angled with respect to each of the third rectangular surface and the first rectangular surface;
a first quadrilateral surface extended as adjacent to the third side and a side of each of the second, third, and fourth rectangular surfaces; and
a second quadrilateral surface extended as adjacent to the fourth side and another side of each of the second, third, and fourth rectangular surfaces;
wherein a roughness average of the first quadrilateral surface is larger than that of each of the first, second, third and fourth rectangular surfaces.

2. The camera module of claim 1, wherein the roughness average of the first quadrilateral surface is 1.0 μm or more.

3. The camera module of claim 1, wherein a roughness average of the second quadrilateral surface is larger than that of each of the first, second, third and fourth rectangular surfaces.

4. The camera module of claim 3, wherein the roughness average of the second quadrilateral surface is 1.0 μm or more.

5. The camera module of claim 1, wherein the first quadrilateral surface satisfies following Equation 1, $$BSDF = \frac{b\sqrt{1+\left(\left(\frac{B-B_0}{l \times g^n}\right)^S\right)^2}}{g^m}$$ [Equation 1]

wherein 0.05<b<0.5, −6.0<S<−0.1, and 0.17<l<1.3, and
wherein B−B0 denotes an angle difference in scattered light in a sine direction, g denotes an average of an angle of scattered light in a cosine direction and an angle of incident light in the 15 cosine direction, b denotes a BSDF value at a reference angle, S denotes an angle of the BSDF, l denotes an angle at which a point where a change in reflected light relative to incident light starts, m denotes cosine power, and n denotes angle power.

6. The camera module of claim 5, wherein the first quadrilateral surface satisfies 0<m<1.6, and 1.1<n<9.0.

7. The camera module of claim 1, further comprising:
a light blocking coating formed on the first quadrilateral surface,
wherein the light blocking coating is adapted to absorb another portion of the light passed through the lens group.

8. The camera module of claim 1, wherein at least one of the first rectangular surface, the second rectangular surface, the third rectangular surface, or the fourth rectangular surface includes an effective area adapted to provide a path of the light passed through the lens group, and a dummy area disposed at an edge area of the effective area.

9. The camera module of claim 8, wherein a roughness average of the dummy area is larger than that of the effective area.

10. The camera module of claim 9, wherein the roughness average of the dummy area is 1.0 μm or more.

11. The camera module of claim 8, wherein the dummy area satisfies following Equation 1, $$BSDF = \frac{b\sqrt{1+\left(\left(\frac{B-B_0}{l\times g^n}\right)^S\right)^2}}{g^m}$$ [Equation 1]

wherein 0.05<b<0.5, −6.0<S<−0.1, and 0.17<l<1.3, and
wherein B−B0 denotes an angle difference in scattered light in a sine direction, g denotes an average of an angle of scattered light in a cosine direction and an angle of incident light in the 15 cosine direction, b denotes a BSDF value at a reference angle, S denotes an angle of the BSDF, I denotes an angle at which a point where a change in reflected light relative to incident light starts, m denotes cosine power, and n denotes angle power.

12. The camera module of claim 11, wherein the first quadrilateral surface satisfies 0<m<1.6, and 1.1<n<9.0.

13. The camera module of claim 8, further comprising:
a mirror coating layer or a low-reflective coating layer disposed on the effective area of the at least one of the first rectangular surface, the second rectangular surface, the third rectangular surface, or the fourth rectangular surface.

14. The camera module of claim 8, further comprising:
a light blocking coating formed on the dummy area,
wherein the light blocking coating is adapted to absorb at least another part of the light passed through the lens group.

15. The camera module of claim 1, wherein the prism includes:
a chamfered area positioned at least one portion of an edge of the prism, and having a roughness average of 1.0 μm or more.

16. The camera module of claim 15, wherein the chamfered area satisfies following Equation 1, $$BSDF = \frac{b\sqrt{1+\left(\left(\frac{B-B_0}{l\times g^n}\right)^S\right)^2}}{g^m}$$ [Equation 1]

wherein 0.05<b<0.5, −6.0<S<−0.1, 0<m<1.6, 1.1<n<9.0, and 0.17<l<1.3m, and
wherein B−B0 denotes an angle difference in scattered light in a sine direction, g denotes an average of an angle of scattered light in a cosine direction and an angle of incident light in the 15 cosine direction, b denotes a BSDF value at a reference angle, S denotes an angle of the BSDF, I denotes an angle at which a point where a change in reflected light relative to incident light starts, m denotes cosine power, and n denotes angle power.

17. The camera module of claim 15, further comprising:
a light blocking coating formed on the chamfered area,
wherein the light blocking coating is adapted to absorb at least another part of the light passed through the lens group.

18. A camera module comprising:
an image sensor;
a lens group including one or more lenses; and
a prism configured to reflect or refract light passed through the lens group such that at least one portion of the light is focused to the image sensor, the prism including:
a top rectangular surface, disposed to face the lens group, including an incident surface area through which the light passing through the lens group is incident;
a bottom rectangular surface, disposed to face the image sensor, substantially parallel with the top rectangular surface, including an exit surface area through which the light exits out of the prism;
a first quadrilateral side surface vertically disposed between a first side edge of the top rectangular surface and a first side edge of the bottom rectangular surface; and
a second quadrilateral side surface vertically disposed between a second side edge of the top rectangular surface and a second side edge of the bottom rectangular surface,
wherein a roughness average of each of the first quadrilateral side surface and the second quadrilateral side surface is larger than that of each of the top rectangular surface and the bottom rectangular surface.

19. A camera module comprising:
an optical member including at least one lens;
a refractive member configured to reflect or refract at least a portion of light; and
an image sensor configured to detect at least a portion of light reflected or refracted by the refractive member and positioned behind the refractive member,
wherein the refractive member includes an effective area including an incident surface, a reflective surface, and an exit surface, and a dummy area disposed at at least a portion of an edge of the effective area,
wherein a surface reflectance of the dummy area is 2.0% or less, and a surface roughness of the dummy area is 1.0 μm or more.

20. The camera module of claim 19, wherein a surface reflectance of the reflective surface exceeds 2.0%, and a roughness average of the effective area is less than 1.0 μm.

* * * * *